(12) United States Patent
Tamaki

(10) Patent No.: US 12,740,551 B2
(45) Date of Patent: Sep. 22, 2026

(54) FISHING LURE

(71) Applicant: K.K. TTT, Shiga (JP)

(72) Inventor: Ao Tamaki, Shiga (JP)

(73) Assignee: K.K. TTT, Shiga (JP)

( * ) Notice: Subject to any disclaimer, the term of this patent is extended or adjusted under 35 U.S.C. 154(b) by 0 days.

(21) Appl. No.: 18/865,809

(22) PCT Filed: Feb. 20, 2024

(86) PCT No.: PCT/JP2024/006077

§ 371 (c)(1),
(2) Date: Nov. 14, 2024

(87) PCT Pub. No.: WO2024/202714

PCT Pub. Date: Oct. 3, 2024

(65) Prior Publication Data

US 2026/0053124 A1 Feb. 26, 2026

(30) Foreign Application Priority Data

Mar. 30, 2023 (JP) ................................ 2023-056422

(51) Int. Cl.
*A01K 85/02* (2006.01)
*A01K 85/00* (2006.01)
*A01K 85/18* (2006.01)

(52) U.S. Cl.
CPC .......... *A01K 85/023* (2022.02); *A01K 85/026* (2022.02); *A01K 85/18* (2013.01)

(58) Field of Classification Search
CPC .... A01K 85/02; A01K 85/023; A01K 85/024; A01K 85/022; A01K 85/025
See application file for complete search history.

(56) References Cited

U.S. PATENT DOCUMENTS 1,391,030 A * 9/1921 George .................. A01K 85/02 43/35
2,518,238 A * 8/1950 Keeler .................. A01K 85/02 43/35
2,991,580 A * 7/1961 Joseph .................. A01K 85/02 43/42.39

(Continued)

FOREIGN PATENT DOCUMENTS

JP S58053559 U 4/1983
JP S63226236 A 9/1988

(Continued)

OTHER PUBLICATIONS

International Search Report for corresponding International Application No. PCT/JP2024/006077 May 14, 2024.

(Continued)

*Primary Examiner* — William L Gmoser
(74) *Attorney, Agent, or Firm* — Chrisman Gallo Tochtrop LLC

(57) ABSTRACT

A lure according to the present disclosure includes, for example, a front body, a fishing hook locked to the front body, and a rear body having a groove portion, wherein the groove portion of the rear body hides at least a part of the fishing hook, the front body and the rear body are connected to be relatively slidable, and when the front body and the rear bod relatively slide, the fishing hook protrudes from the rear body.

9 Claims, 13 Drawing Sheets

(56) References Cited

U.S. PATENT DOCUMENTS

| | | | | |
|---|---|---|---|---|
| 3,266,185 A * | 8/1966 | Abramson, Jr. | A01K 85/02 | 43/37 |
| 3,410,019 A * | 11/1968 | Landi | A01K 85/02 | 43/37 |
| 3,815,274 A * | 6/1974 | Schleif | A01K 83/00 | 43/57.1 |
| 4,782,618 A * | 11/1988 | Rainey | A01K 85/02 | 43/37 |
| 4,827,656 A | 5/1989 | Ohnishi | | |
| 5,890,314 A * | 4/1999 | Peters | A01K 85/02 | 43/37 |
| 6,651,375 B2 * | 11/2003 | Parrish | A01K 85/02 | 43/37 |
| 6,711,848 B1 * | 3/2004 | Gammieri | A01K 85/16 | 43/37 |
| 7,114,285 B1 * | 10/2006 | Ince | A01K 85/01 | 43/42.26 |
| 7,698,852 B1 * | 4/2010 | Cox | A01K 91/10 | 43/37 |
| 8,371,060 B2 * | 2/2013 | Odem | A01K 85/02 | 43/34 |
| 8,689,479 B1 * | 4/2014 | Smith | A01K 85/02 | 43/37 |
| 12,458,007 B1 * | 11/2025 | Bryant | A01K 85/00 | |
| 2010/0083559 A1 | 4/2010 | Meade | | |

FOREIGN PATENT DOCUMENTS

| | | |
|---|---|---|
| JP | 3048571 U | 5/1998 |
| JP | 2006067885 A | 3/2006 |
| JP | 2009072109 A | 4/2009 |
| JP | 2022176045 A | 11/2022 |

OTHER PUBLICATIONS

Written Opinion for corresponding International Application No. PCT/JP2024/006077 May 14, 2024.

Notice of Reasons for Refusal in related Japanese Application No. 2023-056422 May 30, 2023.

* cited by examiner

FISHING LURE

CROSS REFERENCE TO RELATED APPLICATIONS

This application is a national stage entry of International Application No. PCT/JP2024/006077 filed on Feb. 20, 2024, which claims the benefit of priority to Japanese Patent Application No. 2023-056422, filed on Mar. 30, 2023, which is incorporated herein by reference in its entirety.

BACKGROUND

The present disclosure relates to a fishing lure.

Large fish such as a smallmouth bass, largemouth bass, catfish, and Japanese sea bass prey upon fish, and small animals such as earthworms, shrimp, crayfish, frogs, insects, and mice as bait. As means for catching these large fish, lure fishing has become popular. In lure fishing, lures are used. A fishing line is connected to a lure. The lure flies through the air by casting, and eventually lands on the water. By reeling in the fishing line, the lure appears to swim underwater or on the surface of the water. The above-described fish that mistake the lure for bait bite the lure. A fishing hook that is attached to the lure pierces the above-described fish, and the fish is caught.

Conventionally, there have been lures called hard lures in which hard materials such as plastic, wood or metal are used for the materials of the lures, and it is general that in the hard lure, the fishing hook is attached to the lure body in the state in which the entire fishing hook is exposed to the outside (FIG. 1 of JP 2022-176045 A).

Therefore, when hard lures are used around obstacles underwater such as trees, rocks, and the bottom of water where fish are likely to be hiding, there is a problem that the fishing hook is easily caught on the obstacles.

As a hard lure that prevents the fishing hook from being caught on the obstacles, for example, FIG. 1, FIG. 2, and the like of JP 3048571 U disclose a lure in which the hook point portion of a fishing hook is hidden inside the lure body, and the hidden state retaining portion is released by the bite of fish, and the hook point portion of the fishing hook is protruded to the outside by the force of a spring.

Other than the above, there are disclosed a lure in which a fishing hook is built into the lure body, and the fishing hook protrudes to the outside by the biting pressure of fish (JP S63-226236 A), a lure in which locking of a fishing hook locking means is released by the biting pressure of fish, and the hook protrudes to the outside by a spring force (JP S58-53559 U1), and the like.

SUMMARY

However, each of the lures disclosed in JP 3048571 U, JP S63-226236 A, and JP S58-53559 U1 actuates the mechanism in which the fishing hook protrudes to the outside from the body interior by using the biting pressure of fish as the driving force, and it is conceivable that depending on the direction and the strength when the fish bites the lure, the fishing hook does not normally protrude from the lure body, and when fish bites the lure, the hook does not pierce the fish or the hook does not penetrate deep enough into the fish to catch the fish.

In addition, when the fishing hook is built into the lure body by a structure that makes it difficult to replace the hook, there is a problem that if the fishing hook, which generally wears out faster than the lure body, stops functioning normally, the entire lure will stop functioning.

Thus, the present disclosure provide a lure that prevents a fishing hook from being caught on obstacles underwater by hiding a hook point in a body, and enables a fishing hook to be deeply stuck in a mouth of fish by protruding the hook point hidden in the lure body to the outside of the lure body by an action of pulling a fishing line by an angler, no matter how the fish bites the lure, even if the lure is molded from a hard material, and also provide a lure that makes it possible to easily replace a fishing hook.

A lure that is an example of the present disclosure includes a front body;

a fishing hook locked to the front body; and a rear body having a groove portion, wherein the groove portion of the rear body hides at least a part of the fishing hook, the front body and the rear body are connected to be relatively slidable, and when the front body and the rear body relatively slide, the fishing hook protrudes from the rear body.

In the lure that is an example of the present disclosure, the rear body may include a sliding surface with the front body, and an angle formed by the sliding surface, and a plane including a point at a longest distance from the sliding surface in the rear body, and a straight line on the sliding surface that passes through a center point of the sliding surface and intersects perpendicularly to a sliding direction may be 5 to 95 degrees.

In the lure that is an example of the present disclosure, a maximum slide distance of the front body and the rear body may be 6 to 50 mm.

The lure that is an example of the present disclosure may include an elastic member, and the elastic member may urge the front body and the rear body in opposite directions from each other.

In the lure that is an example of the present disclosure, the elastic member may be a compression coil spring, a natural length of the compression coil spring may be 6.1 to 50.1 mm, and a spring constant may be 0.01 to 0.7 N/mm, and a material of the compression coil spring may be stainless steel.

The lure that is an example of the present disclosure may include a shaft, and a shaft hole through which the shaft is inserted, the shaft may be provided at one of the front body and the rear body, and the shaft hole may be provided in another one of the front body and the rear body.

The lure that is an example of the present disclosure may include two shafts with a fishing hook at a center, and a distance between the two shafts may be 3 to 25 mm.

The lure that is an example of the present disclosure may further include another member, the front body may have a groove portion, the other member may fix a fishing hook, and the other member, and the groove portion of the front body may have portions that are along a shape of the fishing hook.

In the lure that is an example of the present disclosure, the other member may have a lip.

In the lure that is an example of the present disclosure, a material of the rear body may be hard plastic.

According to the lure according to the present disclosure, for example, it is possible to prevent the fishing hook from getting caught on obstacles underwater, and to realize that the fishing hook is stuck deeply into the mouth of fish, and it is also possible to replace the fishing hook easily.

DETAILED DESCRIPTION

Hereinafter, a lure 1A of a first embodiment that is an example of the present disclosure will be described with reference to the drawings.

Figure 1:
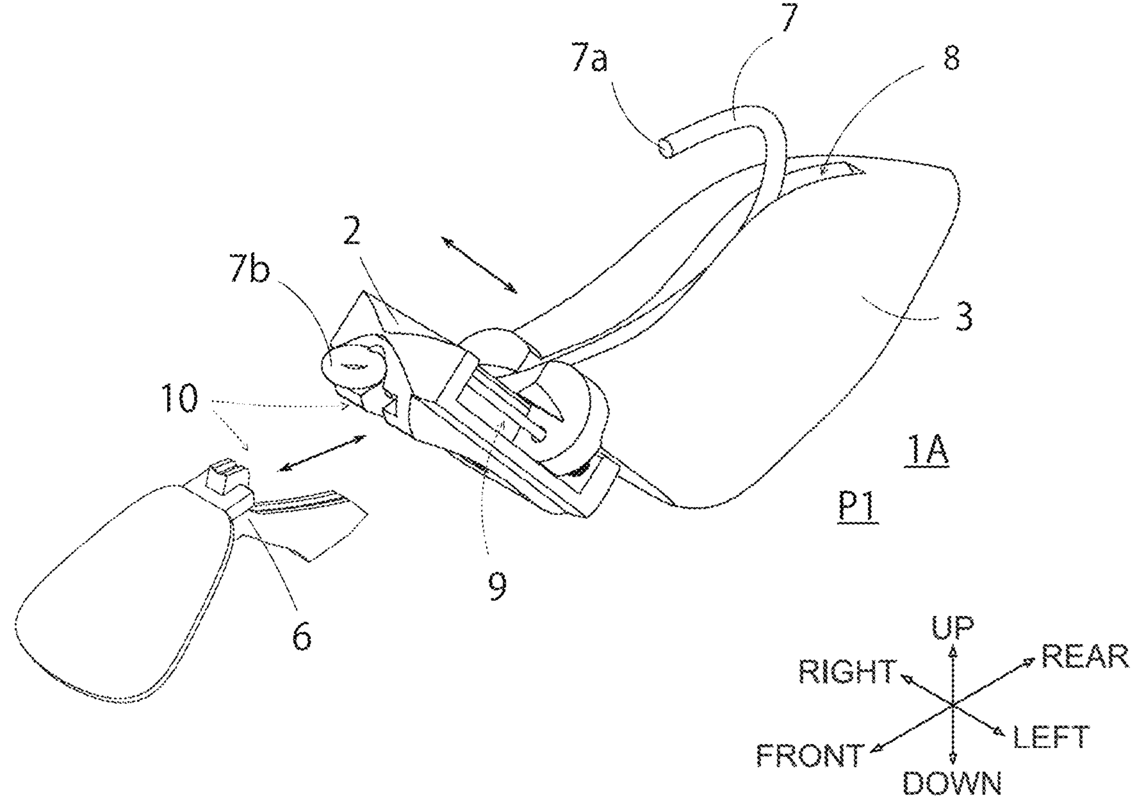
FIG. 1 is a perspective view illustrating an exploded fishing lure according to a first embodiment that is an example of the present disclosure.
Figure 5:
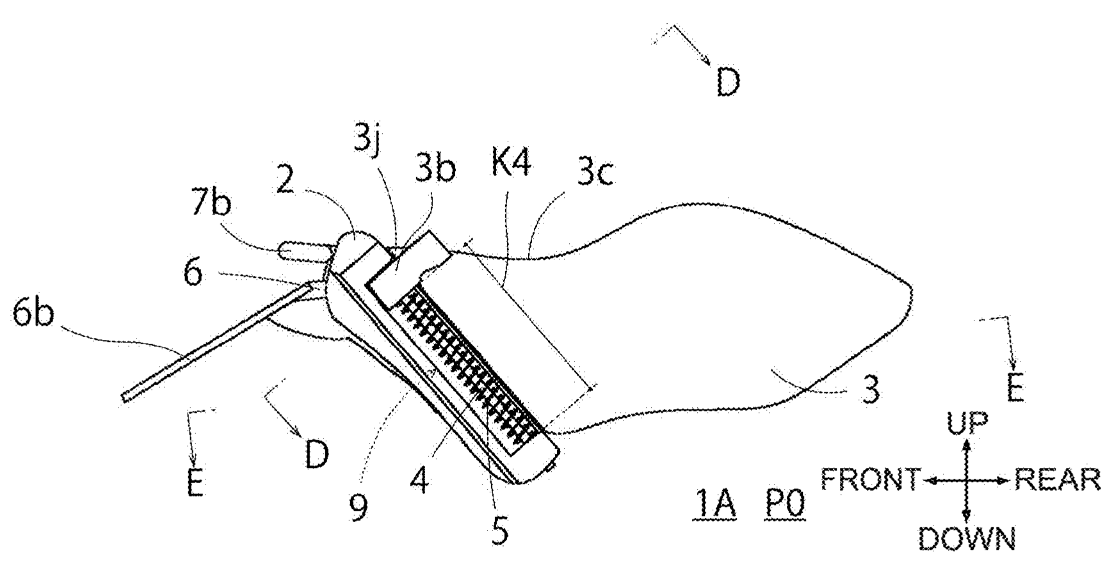
FIG. 5 is a side view of the lure in FIG. 1.
Figure 6:
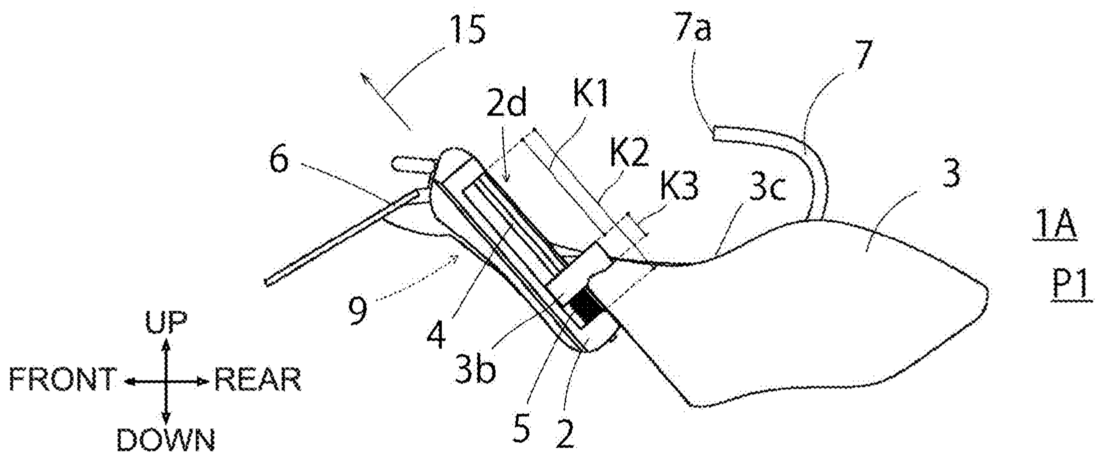
FIG. 6 is a side view of the lure in FIG. 1.
Figure 7:
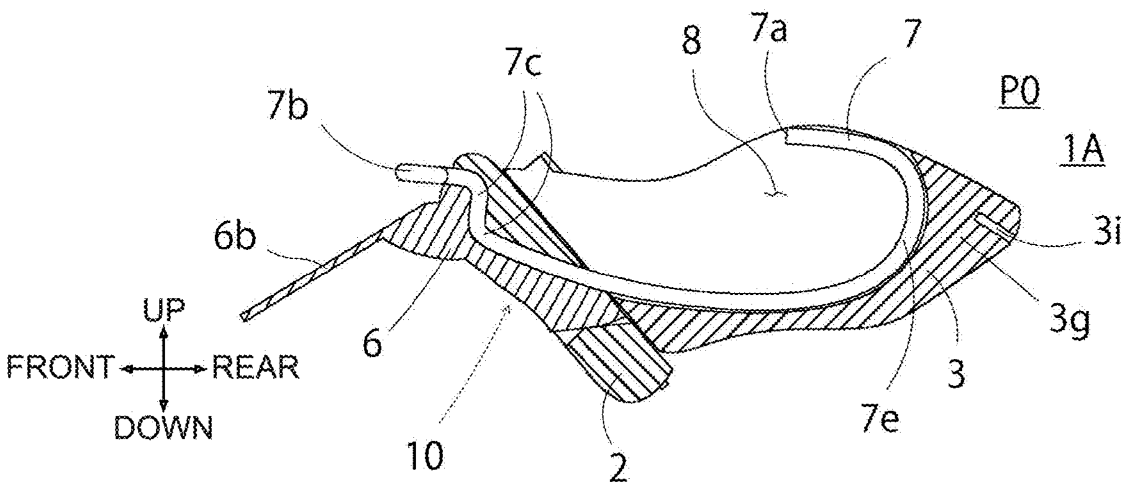
FIG. 7 is a sectional view seen along line B-B in a lure in FIG. 21.
Figure 8:
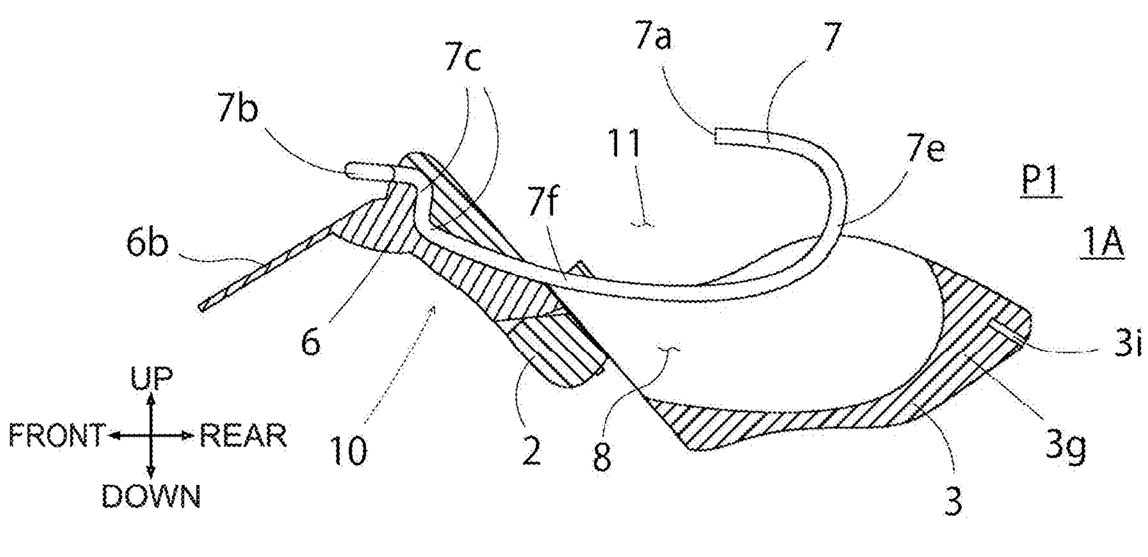
FIG. 8 is a sectional view seen along line C-C in a lure in FIG. 22.

As illustrated in FIG. 1 to FIG. 6, the lure 1A of the present first embodiment includes a front body 2, a rear body 3, a fishing hook pressing member 6 that is a member for attaching and detaching the fishing hook to and from a body, a fishing hook 7, a slide mechanism 9 that connects the front body and the rear body slidably, and in addition, a fishing hook attaching/detaching mechanism 10 as a mechanism for enabling the fishing hook 7 shown in FIG. 1, FIG. 7 and FIG. 8 to be attached to and detached from the lure body. A fishing line is tied to a fishing line fastening portion 7*b* of the fishing hook 7.

Figure 2:
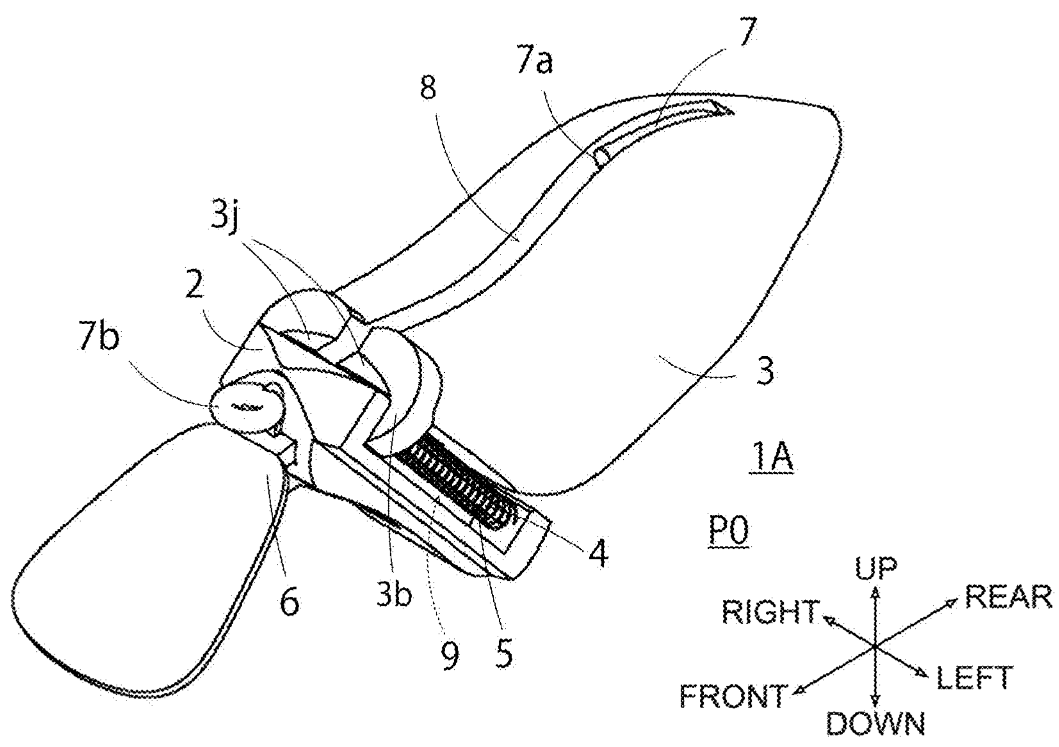
FIG. 2 is a perspective view of the lure in FIG. 1.
Figure 3:
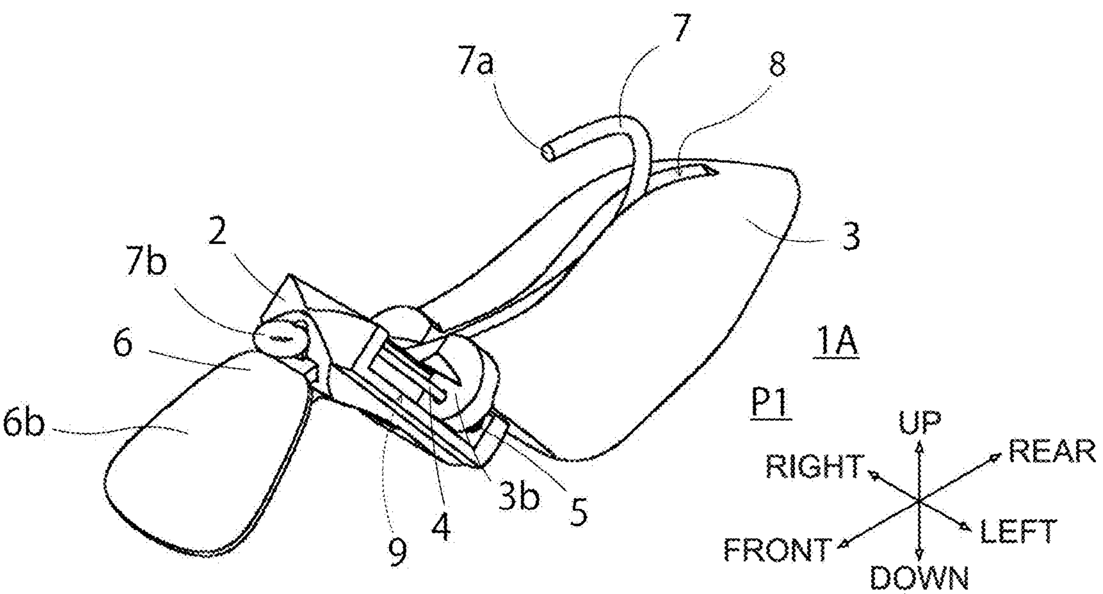
FIG. 3 is a perspective view of the lure in FIG. 1.
Figure 4:
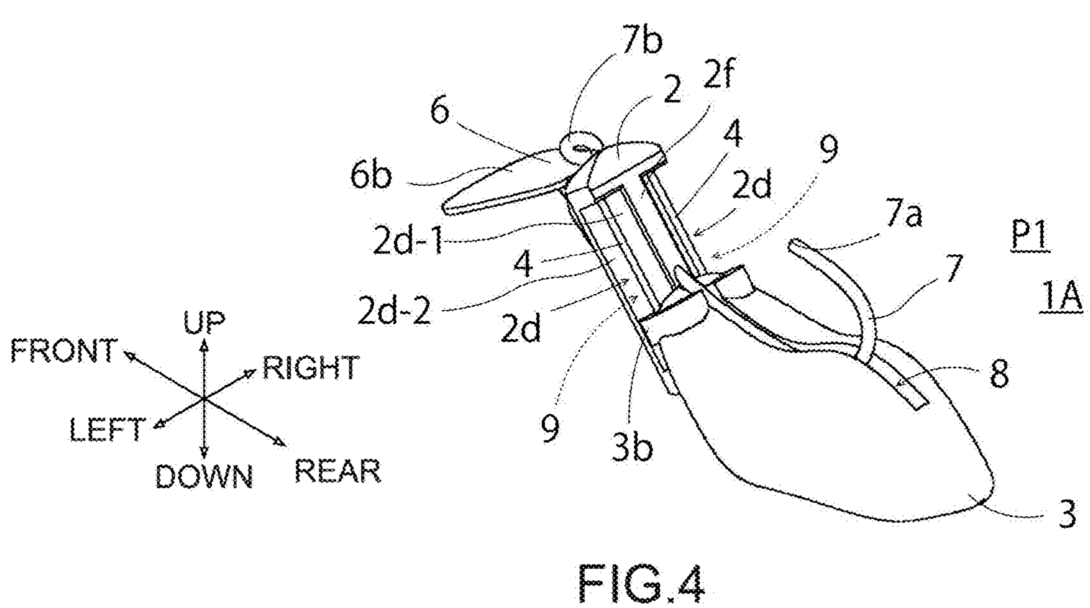
FIG. 4 is a perspective view of the lure in FIG. 1.

The lure 1A of the present first embodiment can be, by the slide mechanism 9, reversibly changed from an initial form P0 illustrated in FIG. 2, FIG. 5 and FIG. 7 in which the fishing hook 7 is accommodated in a fishing hook accommodation portion 8 provided in the rear body 3 to a fishing hook protrusion form P1 illustrated in FIG. 3, FIG. 4, FIG. 6 and FIG. 8 in which from a hook point 7*a* to a curved portion 7*e* of the fishing hook 7 protrudes to an outside of the body. Hereinafter a change in form from the initial form P0 to the fishing hook protrusion form P1 is defined as a transformation A, and a change in form from the fishing hook protrusion form P1 to the initial form P0 is defined as a transformation B. The transformation A and the transformation B can be performed repeatedly.

The fishing hook protrusion form P1 is a state in which a lower side surface of an open space 2*d* described later and an elastic member 5 in a most contracted state, and the elastic member 5 in the most contracted state and a lower side surface of a rear body forward protruding part 3*b* respectively abut on each other, and the initial form P0 is a state in which an upper side surface of the rear body forward protruding part 3*b* and an upper side surface of the open space 2*d* described later abut on each other.

In the lure 1A of the present first embodiment, in the fishing hook protrusion form P1, a part from the hook point 7*a* to the curved portion 7*e* protrudes to an outside of the rear body 3, but only the hook point 7*a* may protrude to the outside of the rear body 3, or a part form the hook point 7*a* to an extension shaft portion 7*f* may protrude to the outside of the rear body 3.

As illustrated in FIG. 5 and FIG. 7, the lure 1A in the initial form P0 is excellent in avoiding obstacles underwater, on a water surface, and in a vicinity of the water surface, because the hook point 7*a* of the fishing hook 7 is hidden in the rear body 3 when the lure 1A is seen from a side surface. When a large external force is not applied, the lure 1A takes on the initial form P0. Examples of such a case are when reeling in water (winding up the lure with a reel), when casting, when carrying, when storing and the like. By pulling the fishing line tied to the fishing line fastening portion 7*b* in a state in which a fish bites the lure 1A in the initial form P0 to actuate the slide mechanism 9, and pulling the fishing hook 7 locked by the front body 2 and the fishing hook pressing member 6 out of the fishing hook accommodation portion 8 provided in the rear body 3 to perform the transformation A, it is possible to stick the fishing hook into the mouth of the fish, and catch the fish. At this time, it is preferable that the fishing hook 7 is stuck into the mouth of the fish simultaneously with the fishing hook 7 being pulled out of the fishing hook accommodation portion 8, but the fishing hook may be stuck into the mouth of the fish by further pulling the fishing line from a timepoint of being changed to the fishing hook protrusion form P1.

Hereinafter, details of the slide mechanism 9 will be described.

Figure 9:
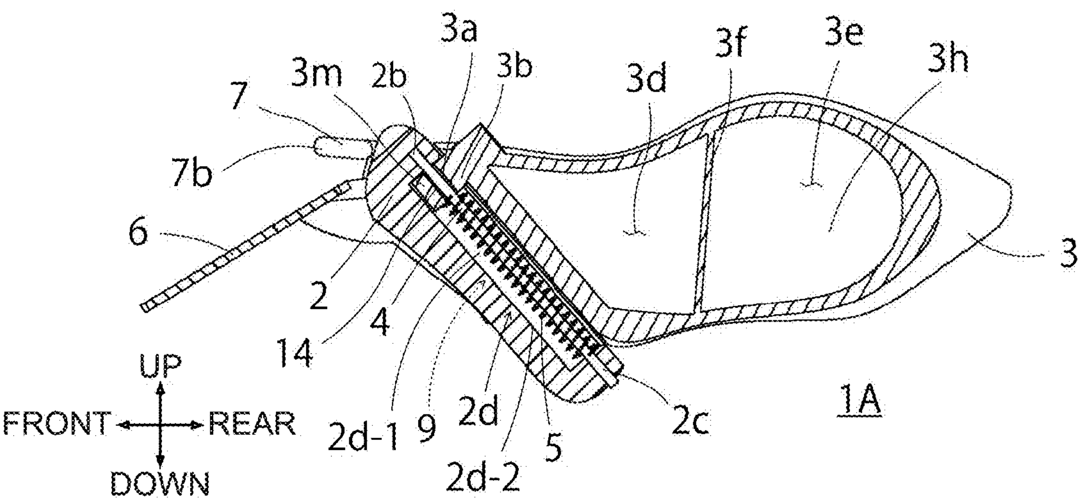
FIG. 9 is a sectional view seen along line A-A in the lure in FIG. 21.
Figure 11:
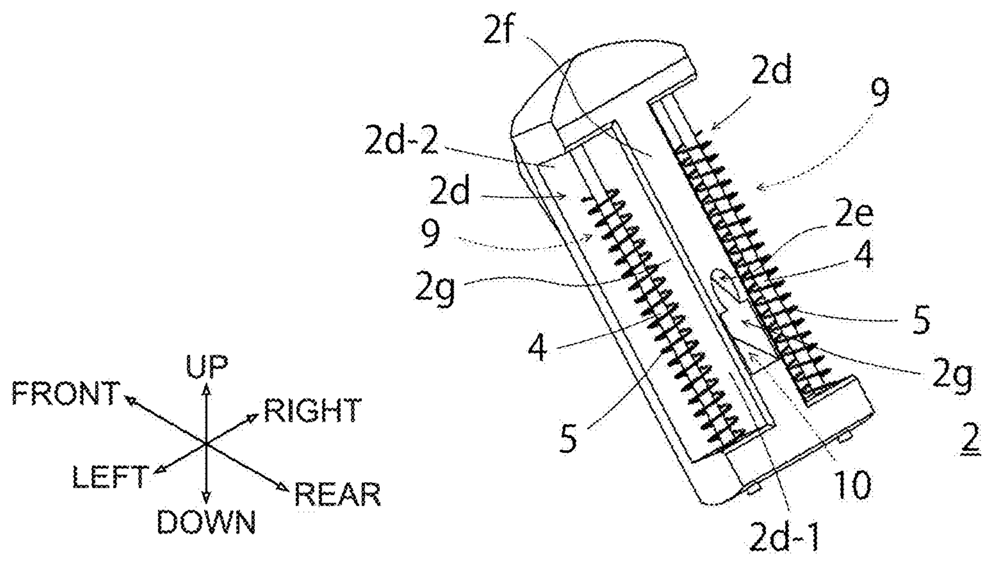
FIG. 11 is a perspective view illustrating a structure of a front body of the lure in FIG. 1.

As illustrated in FIG. 4, the slide mechanism 9 is a mechanism that slidably connects the front body 2 and the rear body 3 to each other, and the transformation A and the transformation B are enabled by the above-described slide mechanism. As illustrated in FIG. 9, in the lure 1A of the present first embodiment, the slide mechanism 9 includes, a shaft 4, the rear body forward protruding part 3*b* that is a part for including a shaft hole provided in the rear body 3, a shaft hole 3*a* provided in the rear body forward protruding part, an elastic member 5, and an open space 2*d* provided in the front body 2. The above-described slide mechanism is provided on each of the left and right with the fishing hook 7 as a center as illustrated in FIG. 4 and FIG. 11, and a slide surface is inclined in an arrow 15 direction illustrated in FIG. 6 with respect to a front-back direction of the lure 1A. In other words, an arrow 15 shows a slide direction of the slide mechanism 9.

It is preferable that the slide mechanism 9 is as light as possible so as not to inhibit movement of the lure at the time of reeling, and in addition, it is preferable that the slide mechanism 9 has sufficient strength to slidably connect the front body 2 and the rear body 3. For the above-described reason, it is preferable that the front body 2 and the rear body 3 are slidably connected by a shaft and a shaft hole through which the shaft is inserted, and in the lure 1A of the present first embodiment, the front body 2 and the rear body 3 are slidably connected by the shaft 4 and the shaft hole 3*a*. However, if the above-described condition is satisfied, it is not always necessary to connect the front and the rear bodies by the shaft and the shaft hole, and the front and rear bodies may be slidably connected, for example, by providing a recessed part or a protruding part to be a rail at either one of the front body or the rear body, and providing a recessed part or a protruding part where the rail is slidable at the other one.

Figure 10:
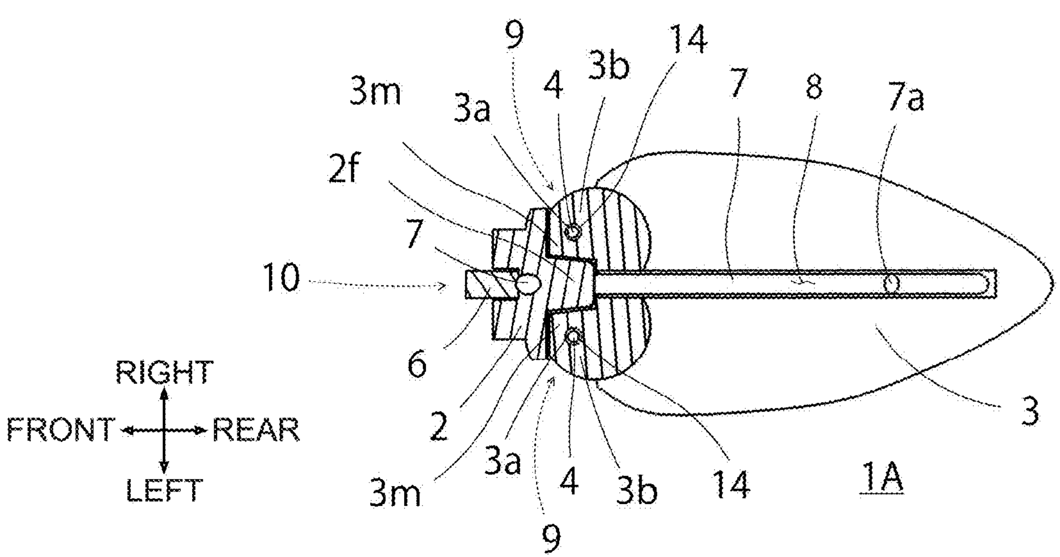
FIG. 10 is a sectional view seen along line D-D in the lure in FIG. 5.

As illustrated in FIG. 9, the shaft 4 is fixed and supported to the front body 2 by an upper end and a lower end of the shaft 4 being press-fitted into an upper shaft installation recessed part 2*b* and a lower shaft installation recessed part 2*c* that are provided respectively in an upper side portion and a lower side portion of the open space 2*d*, which are included in the front body 2. As illustrated in FIG. 9 and FIG. 10, the shaft 4 and the shaft hole 3*a* are included on each of the left and the right with the fishing hook 7 as the center, and the shafts 4 on the left and the right are respectively inserted through the shaft holes 3*a* on the left and the right. By the above-describe structure, the front body 2 and the rear body 3 are mutually connected to be movable (slidable) at an angle parallel to or nearly parallel to the shafts 4 with the shafts 4 on the left and the right as axes.

In order that the lure moves stably at the time of reeling, it is preferable that the structure and the shape of the lure are symmetrical in a left-right direction, and therefore it is preferable that the shafts and shaft holes are included laterally symmetrically. However, when an odd number of shafts are included to be laterally symmetrical, the lure needs to include a shaft at a position that overlaps with the fishing hook when the lure is seen from an upper direction, a length of the shaft is limited by the fishing hook, and it is difficult to include a shaft having a required length to obtain a slide distance that allows the fishing hook long enough to stick deeply into fish to be protruded. In order to include the shaft having the sufficient length to obtain the slide distance that allows the fishing hook of a required length to stick deeply into the fish to be protruded, it is preferable that a tangent line of the extension shaft portion 7*f* of the fishing hook and the shaft are in a skew position, and it is also preferable that the shafts are included laterally symmetrically, so that it is preferable to include two shafts, one on the left and one on the right with the fishing hook as the center. When an even number of shafts, 4 or more, are included, the shape of the lure deviates from a shape perceived by fish as bait, and in addition, the slide mechanisms are likely to become heavy to make movement of the lure at the time of reeling unstable, so that the number of shafts is preferably two. For the above-described reason, the lure 1A of the present first embodiment includes the shaft 4 and the shaft hole 3*a* on each of the left and the right symmetrically in the left-right direction with the fishing hook 7 as the center.

Figure 22:
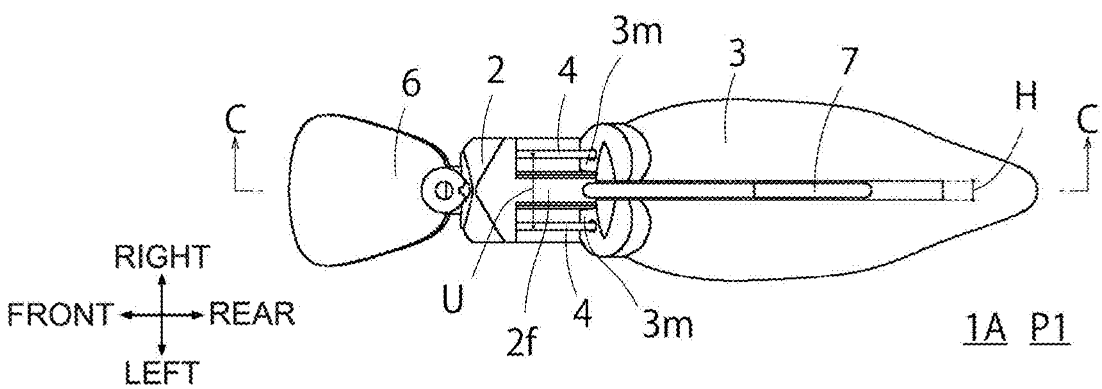
FIG. 22 is a top view of the lure in FIG. 1.

When a value of a distance (length of a straight line U illustrated in FIG. 22) in the left-right direction of the shafts 4 on the left and right is too large, a width in the left-right direction of the lure is so large that the shape of the lure deviates from the shape perceived by fish as bait, and the shape of the lure makes it difficult for the lure to fit into the mouth of the fish, so that it is preferable to make the value of the distance in the left-right direction of the shafts 4 on the left and right as small as possible. However, as illustrated in FIG. 10, FIG. 11, and FIG. 22, it is preferable to include a front body rearward protruding part 2*f* that is a part for the front body 2 to have a required strength, between the shafts on the left and right. In addition, it is preferable that edges 3*m* of the shaft holes, that are illustrated in FIG. 9, FIG. 10, and FIG. 22 are sufficiently thick so that the rear body forward protruding parts 3*b* have sufficient strength. For the above-described reason, it is preferable to make the distance in the left-right direction of the shafts 4 on the left and right as small as possible while including the front body rearward protruding part 2*f* and the edges 3*m* of the shaft holes of sufficient thicknesses, and in the lure 1A of the present first embodiment, the distance (length of the straight line U illustrated in FIG. 22) in the left-right direction of the shafts 4 on the left and right is 7.6 mm. Further, the above-described distance does not necessarily have to be the above-described value, and favorable results were also obtained, even when the above-described distance was 3 to 25 mm according to the thickness in the left-right direction of the front body rearward protruding part 2*f* and the thickness of the edge 3*m* of the shaft hole.

A distance that allows the front body 2 and the rear body 3 to slide is determined by abutment of the upper side surface of the open space 2*d* and the upper side surface of the rear body forward protruding part 3*b*, and abutments of the lower side surface of the open space 2*d* and the elastic member 5, and the elastic member and the lower side surface of the rear body forward protruding part 3*b*, and a maximum slide distance is a length obtained by subtracting a thickness in the arrow 15 direction of the rear body forward protruding part 3*b* (length of a straight line K3 illustrated in FIG. 6) and a length when the elastic member 5 is most contracted (length of the elastic member 5 when in contact) from the length in the arrow 15 direction of the open space 2*d* illustrated in FIG. 6 (length of a straight line K2 illustrated in FIG. 6), and is a length of a straight line K1 illustrated in FIG. 6. Since a length of the fishing hook 7 protruding from the rear body 3 in the transformation A depends on this maximum slide distance, it is preferable that the maximum slide distance (length of the straight line K1 illustrated in FIG. 6) is a length that allows the fishing hook to be protruded long enough to stick deeply into the fish, but when the maximum slide distance is set to be too long, the shape of the lure deviates from the shape that is perceived by fish as bait, and the shape of the lure makes it difficult for the lure to fit into the mouth of the fish.

For the above-described reason, in the lure 1A of the present first embodiment, the maximum slide distance (length of the straight line K1 illustrated in FIG. 6) is 14.4 mm. Furthermore, favorable results were also obtained by setting the maximum slide distance at an appropriate value within a range of 6 to 50 mm according to the size of a fishing hook, an inclination angle of the slide surface, the size and the shape of the body.

In the lure 1A of the present first embodiment, the thickness in the arrow 15 direction of the rear body forward protruding part 3*b* (length of the straight line K3 illustrated in FIG. 6) is 3 mm so that the rear body forward protruding part 3*b* has sufficient strength, but favorable results were also obtained by setting the thickness in the arrow 15 direction of the rear body forward protruding part to an appropriate value within 1 to 10 mm according to the maximum slide distance.

In the lure 1A of the present first embodiment, the shaft hole 3*a* is a hole having a columnar shape, and a diameter of the shaft hole 3*a* is 1.2 mm, but favorable results were also obtained by appropriately setting a dimension of the above-described diameter to a value within a range of 0.5 to 3.8 mm according to a wire diameter of the shaft. Furthermore, the shaft hole does not necessarily have to be columnar or closed.

In the lure 1A of the present first embodiment, a section of the shaft 4 is circular and a diameter of the shaft 4 is 0.8 mm, but favorable results were also obtained by appropriately setting the dimension of the above-described diameter to a value within a range of 0.4 to 3 mm. Furthermore, the section does not necessarily have to be circular, and may be, for example, rectangular or the like.

As illustrated in FIG. 9 and FIG. 10, it is preferable that a gap 14 for allowing smooth slide of the front body 2 and the rear body 3 is present between the shaft and the shaft hole. In other words, it is preferable that the shaft is thinner than the shaft hole. In the lure 1A of the present first embodiment, the diameter of the shaft hole 3*a* is 1.2 mm, and the diameter of the shaft 4 is 0.8 mm, and the diameter of the shaft is 0.4 mm thinner than the diameter of the shaft hole. Favorable results were also obtained by appropriately setting the value obtained by subtracting the value of the diameter of the shaft from the value of the diameter of the shaft hole to a value within a range of 0.1 to 0.8 mm according to the diameter of the shaft.

In the lure 1A of the present first embodiment, the shape of the shaft 4 is a straight line, but does not necessarily have to be a straight line, and if the shaft hole 3*a* is smoothly movable along the shaft, the shape of the shaft may be bent or curved.

In the lure 1A of the present first embodiment, the shaft 4 is fixed and supported to the front body 2 by being press-fitted into the upper shaft installation recessed part 2*b* and the lower shaft installation recessed part 2*c*, but the method for fixing and supporting the shaft 4 to the front body 2 does not necessarily have to be the above-described method.

The shaft 4 needs to be molded from a material that is resistant to rust, and in the present first embodiment, the material of the shaft is stainless steel. Furthermore, in the lure 1A of the present first embodiment, the material of the shaft is stainless steel, but may be a material such as metal resistant to rust other than stainless steel, carbon, and resin.

As illustrated in FIG. 4 and FIG. 11, the open spaces 2*d* are spaces that are provided at a rear part of the front body 2, one on the left and one on the right with the fishing hook 7 at the center, and opens to the left and the right, respectively. A surface on an inner side of the open space is an open space center surface 2*d*-1, and a surface on a front side is an open space front surface 2*d*-2. The open space is a space for the shaft 4, the elastic member 5, and the rear body forward protruding part 3*b* to be installed, and for the rear body forward protruding part to be movable along the shaft. A length in the arrow 15 direction of the open space (length of the straight line K2 illustrated in FIG. 6) is one of factors that determine the maximum slide distance. The length in the arrow 15 direction of the open space is preferably such a length that a slide distance is obtained that allows the fishing hook to protrude long enough to stick deeply into the fish. Furthermore, as illustrated in FIG. 11, the open spaces on the left and right are separated in center by the front body rearward protruding part 2*f*, and the front body rearward protruding part is a part intended to compensate for the strength that is lost when the front body 2 is provided with a fishing hook fitting recessed part 2*e*, a fishing hook pressing member fitting recessed part 2*a*, and the open space.

In the lure 1A of the present first embodiment, the length in the arrow 15 direction of the open space (length of the straight line K2 illustrated in FIG. 6) is 20 mm, but favorable results were also obtained by setting the length in the arrow 15 direction of the open space to an appropriate value within a range of 7 to 60 mm according to the size of the fishing hook, the inclination angle of the slide surface, the size and the shape of the body.

In the lure 1A of the present first embodiment, the open space center surface 2*d*-1 and the open space front surface 2*d*-2 are planes parallel to the shaft 4, but the open space center surface and the open space front surface do not necessarily have to be the planes parallel to the shaft, and may be curved surfaces or planes inclined with respect to the shaft if these planes are within the range in which the shaft hole 3*a* is smoothly movable along the shaft.

In the lure 1A of the present first embodiment, the front body rearward protruding part 2*f* has a lateral width that becomes smaller as progresses to a rear side, but does not necessarily have the above-described shape, and may have a same lateral width at all spots, or may have a lateral width that becomes larger as progresses to the rear side.

As shown in FIG. 9 and FIG. 11, the elastic member 5 is provided between the lower side surface of the open space 2*d* and the lower side surface of the rear body forward protruding part 3*b*, and abuts on the lower side surface of the open space 2*d* and the lower side surface of the rear body forward protruding part 3*b*. A natural length of the elastic member 5 (length when no load is applied) is longer than a length obtained by subtracting a thickness in the arrow 15 direction of the rear body forward protruding part 3*b* from the length in the arrow 15 direction of the open space 2*d* (length of a straight line K4 illustrated in FIG. 5). In all the forms of the lure 1A, the elastic member is in a state of being shorter than the natural length (length when no load is applied). The elastic ember urges the front body 2 in an opposite direction to the arrow 15, and the rear body 3 in the arrow 15 direction respectively, and thereby the shape of the initial form P0 is maintained. Furthermore, the elastic member urges the front body 2 in the opposite direction to the arrow 15, and the rear body 3 in the arrow 15 direction respectively, whereby the lure 1A that is in the fishing hook protrusion form P1 or a middle form between the fishing hook protrusion form P1 and the initial form P0 without a large external force being applied naturally changes to the initial form P0, and a state of the initial form P0 is maintained.

In the lure 1A of the present first embodiment, the shaft 4 has both ends fixed and supported to the front body 2, the shaft hole 3*a* and the rear body forward protruding part 3*b* that is a part for including the shaft hole are included in the rear body 3, and the elastic member 5 is included at a position on a lower side (opposite direction side to the arrow 15) of the rear body forward protruding part. However, both the ends of the shaft may be fixed and supported to the rear body, the shaft hole and the protruding part for including the shaft hole may be included in the front body, and in the case described here, the elastic member is included at a position on the upper side (arrow 15 direction side) from the protruding part for including the shaft hole.

In order to more increase the maximum slide distance (length of the straight line K1 illustrated in FIG. 6) of the front body 2 and the rear body 3, it is preferable that the elastic member 5 contracts as much as possible, and in addition, it is preferable that the elastic member 5 is sufficiently light so that the lure stably moves at the time of reeling. For this reason, it is preferable that the elastic member 5 is a compression coil spring. In the lure 1A of the present first embodiment, the elastic member 5 is a compression coil spring, and the shaft 4 is inserted through a center of the elastic member 5.

When a value of a spring constant of the compression coil spring is too large, the compression coil spring hinders the transformation A to make it difficult to stick the fishing hook into fish. Therefore, it is preferable that the value of the spring constant of the compression coil spring is sufficiently small. In the lure 1A of the present first embodiment, the spring constant of the compression coil spring is 0.029 N/mm. Furthermore, favorable results were also obtained by setting the spring constant of the compression coil spring to an appropriate value within a range of 0.01 to 0.7 N/mm according to the inclination angle of the slide surface of the slide mechanism 9 and a length obtained by subtracting the thickness in the arrow 15 direction of the rear body forward protruding part 3*b* from the length in the arrow 15 direction of the open space 2*d* (length of a straight line K4 illustrated in FIG. 5).

In order to urge the front body 2 and the rear body 3 in opposite directions to each other, it is preferable that the natural length (length when no load is applied) of the compression coil spring is longer than a length obtained by subtracting the thickness in the arrow 15 direction of the rear body forward protruding part 3*b* from the length in the arrow 15 direction of the open space 2*d* (length of the straight line K4 illustrated in FIG. 5). In the lure 1A of the present first embodiment, the natural length of the compression coil spring is 17.4 mm. Furthermore, favorable results were also obtained by setting the natural length of the compression coil spring to an appropriate value within a range of 6.1 to 50.1 mm according to the length of the straight line K4.

It is preferable to mold the compression spring from a material resistant to rust, and in the present first embodiment, the material of the compression coil spring is stainless steel. Furthermore, in the lure 1A of the present first embodiment, the material of the compression coil spring is stainless steel, but may be a material such as metal resistant to rust other than stainless steel, carbon, and resin.

In the lure 1A of the present first embodiment, the elastic member 5 is a compression coil spring, but the elastic member is not limited to a compression coil spring, but may be other elastic bodies such as a leaf spring, and rubber.

Although the lure 1A of the present first embodiment includes the elastic member 5, the elastic member 5 does not have to be included when the lure takes on the initial form P0 at the time of reeling underwater without including the elastic member. Examples include the case in which the rear body is urged in the arrow 15 direction with respect to the front body due to a difference between buoyancy applied to the front body 2 and buoyancy applied to the rear body 3, and the like. A maximum slide distance when the elastic member 5 is not included is the length obtained by subtracting the thickness in the arrow 15 direction of the rear body forward protruding part 3*b* from the length in the arrow 15 direction of the open space 2*d* (length of the straight line K4 illustrated in FIG. 5).

Figure 12:
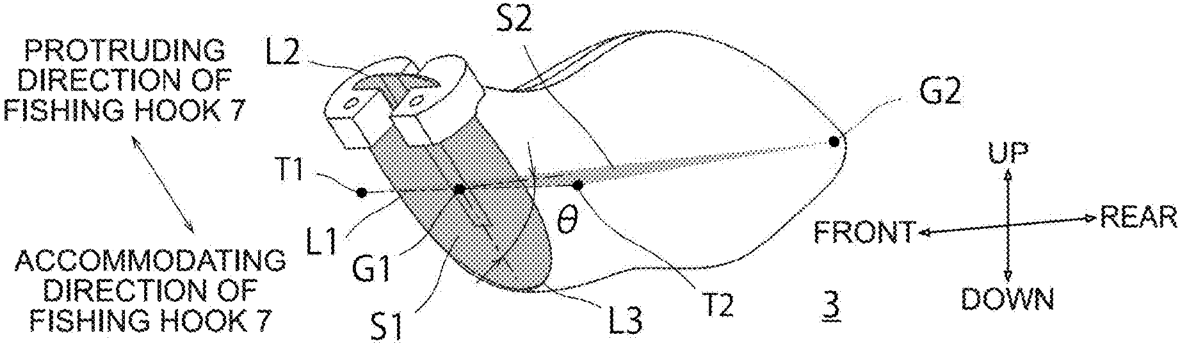
FIG. 12 is an explanatory perspective view illustrating a shape of a rear body of the lure in FIG. 1.

The inclination angle of the slide surface of the slide mechanism 9 will be described hereinafter while being illustrated in FIG. 12. The slide surface of the slide mechanism, that is, a sliding surface of the front body 2 and the rear body 3 inclines with respect to a front-rear direction of the body. As a result, when a fish bites the lure 1A and the fishing line, which is tied to the line fastening portion 7*b*, is pulled, the front body 2 and the rear body 3 slide with a small force. A force that pulls the fish line tied to the fishing line fastening portion 7*b* is efficiently converted into a force that sticks the fishing hook into the fish, and when the fishing hook 7 is pulled out of the fishing hook accommodation portion 8, the fishing hook protrudes to the outside of the rear body 3 from the hook point 7*a* first, whereby the fishing hook 7 is stuck into the mouth of the fish at the same time as the fishing hook 7 is pulled out of the fishing hook accommodation portion 8, and it is possible to deeply stick the fishing hook 7 into the fish. As illustrated in FIG. 12, a plane defined by a sliding surface outer line L2 in a protruding direction of the fishing hook 7, of the rear body 3, and a sliding surface outer line L3 in an accommodation direction of the fishing hook, of the rear body is set as S1. Furthermore, a plane connecting a point G2 on the rear body that is away from the sliding surface of the rear body by a longest distance, and a straight line L1 on the sliding surface that passes through a center point G1 of a sliding movable portion sliding surface of the sliding surface of the rear body 3 and perpendicularly intersects the sliding direction (in other words, a plane defined by three points that are two arbitrary different points T1 and T2 on L1 and G2) is set as S2. It is preferable to incline the sliding surface of the rear body 3 so that an angle (θ) between S1 and S2 becomes 5 to 95 degrees. When a value of θ becomes extremely larger than the above-described range, the angle between the direction to pull the fishing line and the sliding surface becomes large, as a result of which, the front body 2 and the rear body 3 do not slide when the fishing line is pulled, or a larger force is required to slide, and in addition, the fishing hook 7 does not protrude to the outside of the body from the hook point first when the fishing hook 7 is pulled out of the fishing hook accommodation portion 8, and therefore it is difficult to stick the fishing hook 7 into the fish. On the other hand, when the value of θ becomes extremely smaller than the above-described range, the hook point does not protrude into the spot which the fish is biting, and therefore it is difficult to stick the fishing hook 7 into the fish.

As illustrated in FIG. 5 and FIG. 6, the rear body 3 includes a rear body curved portion 3*c*, and the rear body has a shape in which a front part of the upper side portion is curved in a lower direction. As illustrated in FIG. 6, the rear body curved portion is intended to more increase a space formed by the upper side portion of the rear body 3 and a rear side portion of the front body 2 in the lure 1A in the fishing hook protrusion form P1, in other words, a space (hooking space 11) that is opened to an upper side of the extension shaft portion 7*f* in the lure 1A in the fishing hook protrusion form P1, and to stick the fishing hook 7 more deeply into the fish. When the hooking space is not sufficiently large, the rear body 3 interferes with the mouth of the fish to prevent the fishing hook from getting stuck.

However, if a whole or a part of the rear body 3 is molded from a material having flexibility, and the hooking space having a sufficient size is formed by contraction deformation in an up-down direction of the rear body 3 in the transformation A, it is not necessary to provide the rear body curved portion 3*c* in the rear body 3.

As illustrated in FIG. 7 and FIG. 8, the rear body 3 includes the fishing hook accommodation portion 8. The fishing hook accommodation portion is a part for accommodating a rear portion of the fishing hook 7 (portion from the extension shaft portion 7*f* to the hook point 7*a*) in the initial form P0. As illustrated in FIG. 5 and FIG. 7, the rear body 3 and the fishing hook accommodation portion 8 are in a shape in which the rear body hides the rear portion of the fishing hook 7 when the lure 1A in the initial form P0 is seen from a side surface. As illustrated in FIG. 7 and FIG. 8, in the fishing hook accommodation portion, at least a part of the upper side portion and at least a part of the front side portion are opened so that the fishing hook 7 and the rear body 3 do not interfere with each other at the time of the transformation A and the transformation B, and as illustrated in FIG. 10, a width in the left-right direction of the fishing hook accommodation portion is the same as or wider than a line diameter of the fishing hook 7. Furthermore, the reason why the front side portion of the fishing hook accommodation portion is opened is to insert the fishing hook into the fishing hook accommodation portion when the fishing hook 7 is attached to the lure body. In the lure 1A of the present embodiment, the lower side portion and the rear side portion of the fishing hook accommodation portion are completely closed, but do not necessarily have to be closed.

In the lure 1A of the present first embodiment, the rear body 3 and the fishing hook accommodation portion 8 are in a shape in which the rear body hides the rear portion of the fishing hook 7 when the lure 1A in the initial form P0 is seen from the side surface, but the rear body 3 and the fishing hook accommodation portion 8 do not necessarily have to be in the shape in which the rear body hides the entire rear portion of the fishing hook 7 when the lure 1A in the initial form P0 is seen from the side surface, and the portions other than the hook point 7*a* of the fishing hook 7, for example, the portions such as the extension shaft portion 7*f*, and the curved portion 7*e* may be exposed to the outside of the rear body.

Since the fishing hook accommodation portion is filled with water when the lure 1A is underwater, the buoyancy of the upper side portion of the body becomes small, and movement of the lure 1A at the time of reeling tends to be unstable as compared with an ordinary lure that does not include the fishing hook accommodation portion. In order to obtain stable movement at the time of reeling without changing the width in the left-right direction of the lure, it is effective to reduce the width in the left-right direction of the fishing hook accommodation portion 8 as much as possible within a range in which the fishing hook can be accommodated, and increase volumes of a front air chamber 3*d* and a rear air chamber 3*e* described later. For the above-described reason, in the lure 1A of the present first embodiment, the width in the left-right direction of the fishing hook accommodation portion 8 (length of a straight line H illustrated in FIG. 22) is 1.6 mm. Furthermore, the lateral width of the fishing hook accommodation portion 8 does not have to be limited to the above-described value, and favorable results were also obtained by setting the lateral width of the fishing hook accommodation portion 8 to an appropriate value within a range of 0.2 to 10 mm according to the width in the left-right direction of the fishing hook (generally, the wire diameter of the fishing hook).

Figure 13:
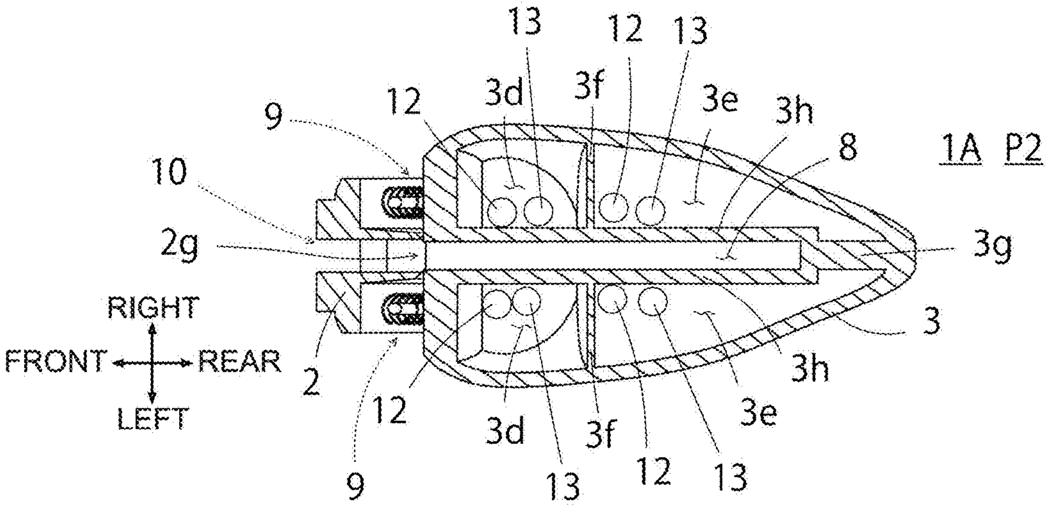
FIG. 13 is a sectional view seen along line E-E in the lure in FIG. 5.

As illustrated in FIG. 9 and FIG. 13, the rear body 3 is a hollow structure including a front air chamber 3*d* and a rear air chamber 3*e*. Left and right air chambers are separated by the fishing hook accommodation portion 8 and two center walls 3*h*. The front air chamber and rear air chamber are closed so that air does not escape in the water.

As illustrated in FIG. 13, in the lure 1A of the present embodiment, a rattle 12 (small ball made of glass, metal, resin or other materials for making noise) and a weight 13 (made of metal, high specific gravity resin and the like) are sealed in each of all the air chambers, but the rattle and weight do not necessarily have to be sealed in each of all the air chambers, and pluralities of the rattles and weights may be sealed in one of the air chambers, or a rattle or weight does not have to be sealed in all of the air chambers. Furthermore, the front air chamber and rear air chamber are separated by an air chamber dividing wall 3*f*, the air chamber dividing wall is intended to secure strength of the body and limits a movable range of the rattle, and the number of the air chamber dividing walls may be increased in the front-rear direction, or no air chamber dividing wall may be included.

As illustrated in FIG. 13, in the lure 1A of the present embodiment, the rear air chambers 3*e* on the left and the right are separated by a reinforcement portion 3*g*, but when the strength of the rear body 3 is sufficient, the reinforcement portion 3*g* does not have to be provided.

As illustrated in FIG. 7 and FIG. 8, in the lure 1A of the present first embodiment, the rear body 3 includes a screw eye hole 3*i* for installing a screw eye. The screw eye hole may be a circular groove portion for including a metal fitting in a shape of FIG. 8 that is generally called an eight ring. The screw eye hole or groove portion for attaching the eight ring may be provided at each of a plurality of spots of the rear body 3, or may not be provided.

As illustrated in FIG. 2 and FIG. 5, in the lure 1A of the present first embodiment, the rear body 3 includes a shape retaining portion 3*j* at a front part of an upper side portion. While the front body 2 and the rear body 3 are connected by the shafts 4 and the shaft holes 3*a*, and as illustrated in FIG. 9 and FIG. 10, the gaps 14 for allowing smooth slide of the front body 2 and the rear body 3 are provided between the shafts and shaft holes, very small amounts of yawing and pitching occur between the front body 2 and the rear body 3 due to the gaps. The shape retaining portion suppresses the above-described very small amounts of yawing and pitching by a part of the shape retaining portion contacting the front body 2 in the lure 1A in the initial form P0. However, the shape retaining portion may not be provided.

As illustrated in FIG. 1, FIG. 7, FIG. 8, FIG. 10, and FIG. 14 to FIG. 18, the lure 1A includes a fishing hook attaching/detaching mechanism 10. The fishing hook attaching/detaching mechanism is a mechanism for the purpose of allowing and facilitating replacement of the fishing hook. The fishing hook attaching/detaching mechanism includes a fishing hook pressing member fitting protruding part 6*a* included in the fishing hook pressing member 6, a fishing hook support slit 6*c* that is a groove portion included in a contact part of the fishing hook pressing member fitting protruding part with the fishing hook 7, a fishing hook pressing member fitting recessed part 2*a* that is a groove portion included in the front body 2, a fishing hook fitting recessed part 2*e* that is a groove portion included in a contact part of the fishing hook pressing member fitting recessed part with the fishing hook, and a fishing hook insertion hole 2*g* that opens the fishing hook pressing member fitting recessed part to the fishing hook accommodation portion 8 of the rear body 3. Since the fishing hook pressing member fitting protruding part and the fishing hook pressing member fitting recessed part are detachably fitted to each other, the fishing hook pressing member is attachable to and detachable from the front body. Furthermore, the fishing hook fitting recessed part and a front portion of the fishing hook 7 (part from a rear portion from the fishing line fastening portion 7*b* to the extension shaft portion 7*f*) are also detachably fitted to each other. By sandwiching the front portion of the fishing hook 7 with the fishing hook pressing member and the front body, and the front portion of the fishing hook 7 and the front body being detachably fitted to each other, it is possible to lock the fishing hook to the front body attachably and detachably with the front body and the fishing hook pressing member. When it is possible to firmly lock the fishing hook only by sandwiching the fishing hook with the front body and the fishing hook pressing member, the fishing hook fitting recessed part that is a part to be fitted to the fishing hook does not have to be included in the front body.

Steps for attaching and detaching the fishing hook to and from the front body 2 by the fishing hook attaching/detaching mechanism 10 will be described hereinafter with illustration in FIG. 19.

Fishing Hook Attaching Method

After the rear portion of the fishing hook 7 (portion from the extension shaft portion 7*f* to the hook point 7*a*) is inserted into the fishing hook accommodation portion 8 of the rear body 3 through the fishing hook insertion hole 2*g* included in the front body 2 from the hook point 7*a* first, the front portion of the fishing hook 7 to be fitted into the fishing hook fitting recessed part 2*e* is fitted into the fishing hook fitting recessed part (attachment A), and the fishing hook pressing member fitting protruding part is (detachably) press-fitted into the fishing hook pressing member fitting recessed part 2*a* included in the front body, which is fitted to the fishing hook pressing member fitting protruding part 6*a* included in the fishing hook pressing member 6 (attachment B). By the attachment A and attachment B, the front portion of the fishing hook is sandwiched by the fishing hook pressing member fitting protruding part and the fishing hook pressing member fitting recessed part, and in addition, the front portion of the fishing hook and the fishing hook fitting recessed part 2*e* are fitted to each other, whereby the fishing hook is locked by the front body and the fishing hook pressing member, and the fishing hook is fixed to the front body (detailed steps of the attachment A will be described later).

Fishing Hook Detaching Method

After the fishing hook pressing member is detached from the front body by extracting the fishing hook pressing member fitting protruding part from the fishing hook pressing member fitting recessed part (detachment B), the fishing hook is detached from the fishing hook fitting recessed part, and further, by extracting the rear portion of the fishing hook from the fishing hook accommodation portion through the fishing hook insertion hole (detachment A), the fishing hook pressing member and the fishing hook are detached from the front body.

Figure 19:
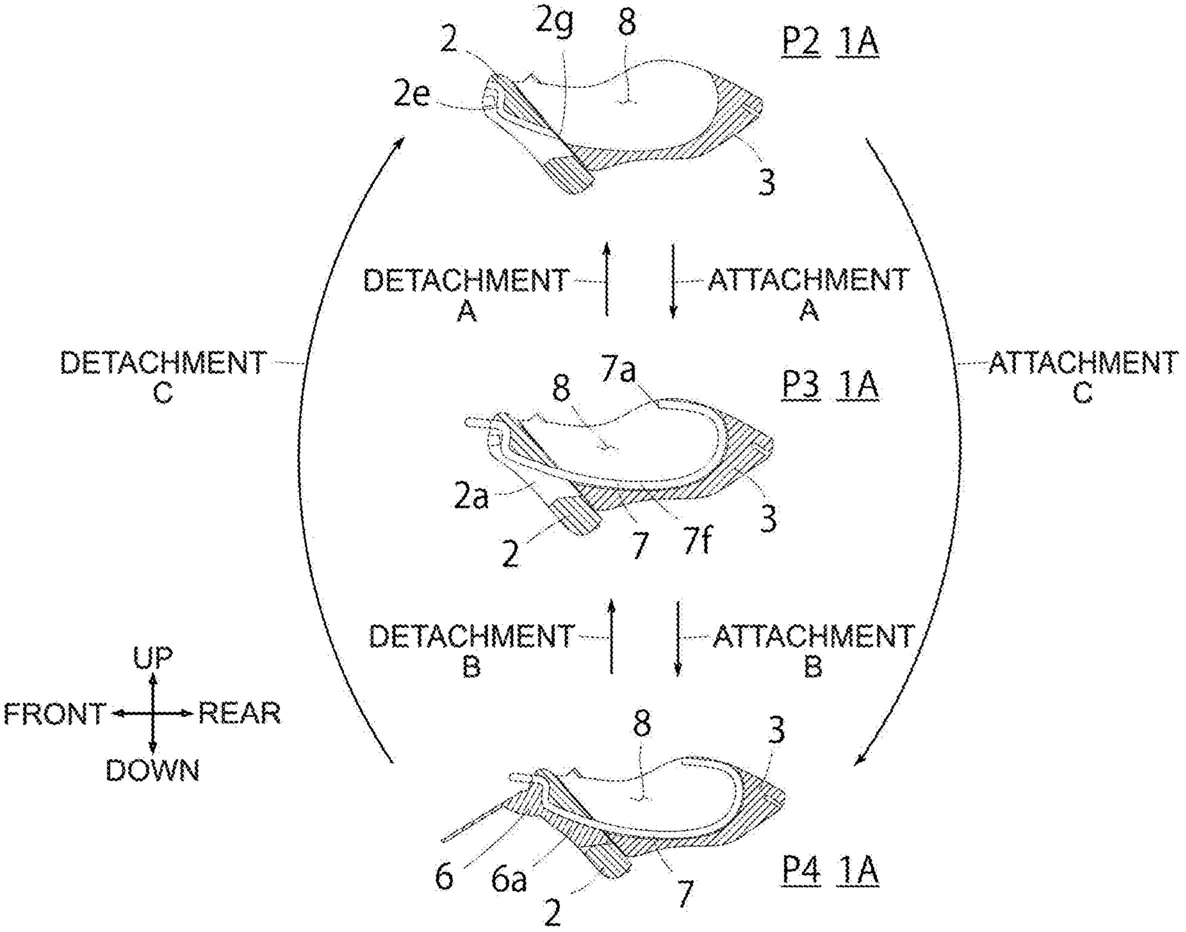
FIG. 19 is an explanatory sectional side view illustrating a process of attaching and detaching the fishing hook of the lure in FIG. 1.

As illustrated in FIG. 19, hereinafter, in the lure 1A, a form in which the detachment A is completed, that is, the form in which the fishing hook 7 and the fishing hook pressing member 6 are not attached to the front body 2 is defined as a front part open form P2, and a form in which the attachment A is performed in the front part open form P2 is defined as a fishing hook attached form P3. Furthermore, a form in which the attachment B is performed for the lure 1A in the fishing hook attached form P3 is defined as a complete form P4, in addition to which, further performing attachment B after performing the attachment A for the lure 1A in the front part open form P2 to bring the lure 1A into the complete form P4 is defined as attachment C, and further performing the detachment A after the detachment B is performed to the lure 1A in the complete form P4 to bring the lure 1A into the front part open form P2 is defined as detachment C.

Particulars of the fishing hook attaching/detaching mechanism 10 will be described hereinafter.

Figure 14:
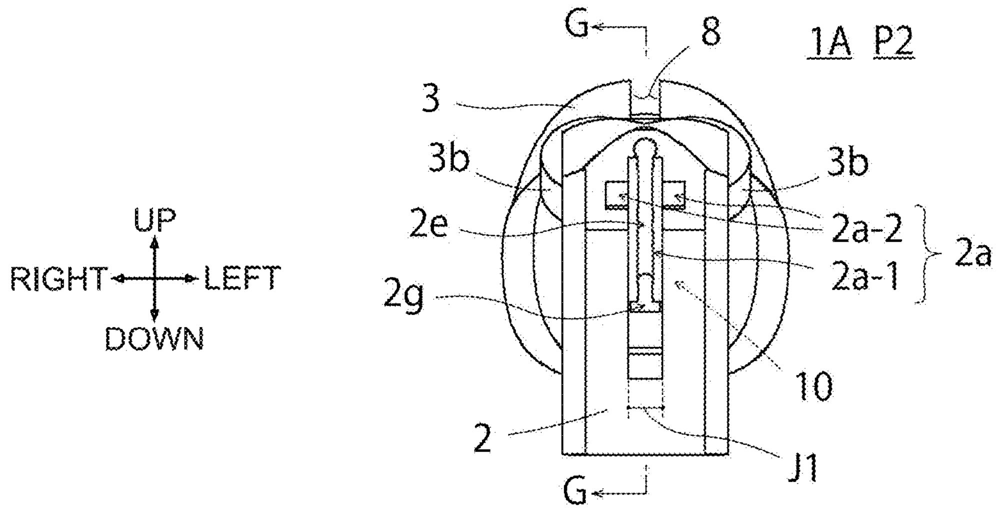
FIG. 14 is a front view of the lure in FIG. 1.
Figure 15:
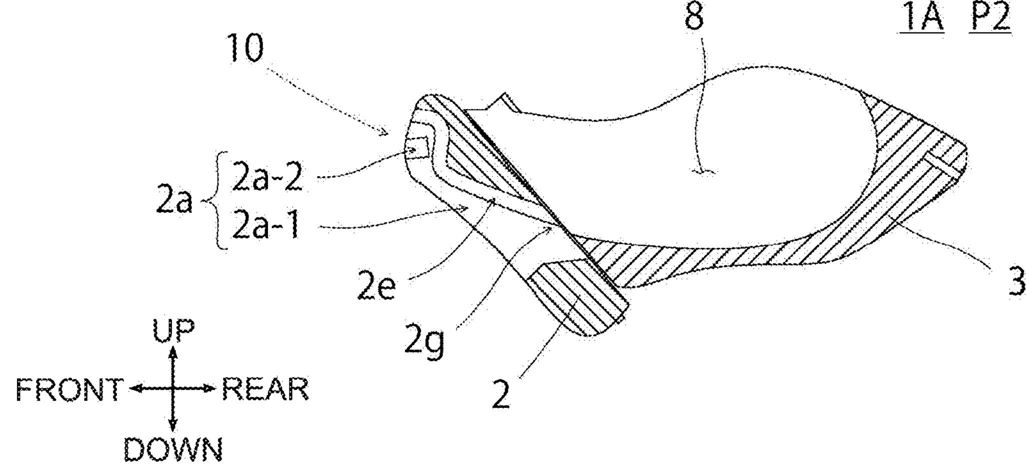
FIG. 15 is a sectional view seen along line G-G of the lure in FIG. 14.
Figure 16:
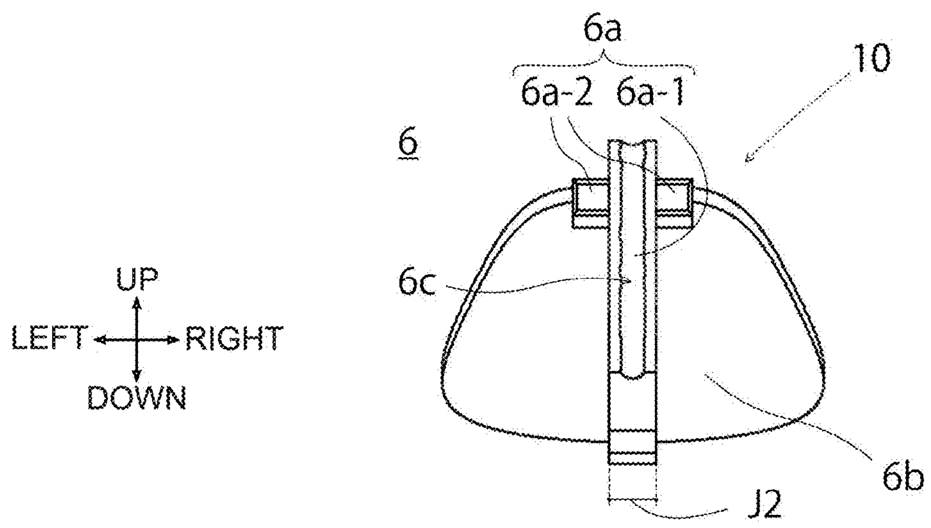
FIG. 16 is a rear view illustrating a fishing hook pressing member of the lure in FIG. 1.
Figure 17:
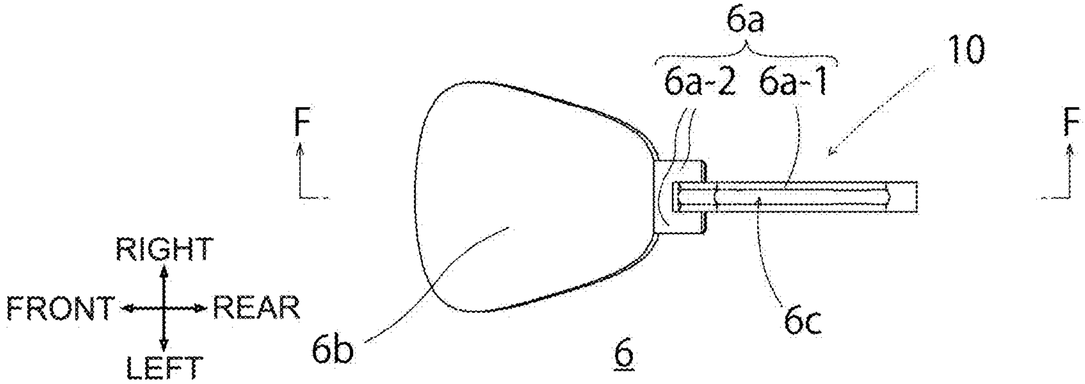
FIG. 17 is a top view illustrating the fishing hook pressing member of the lure in FIG. 1.
Figure 18:
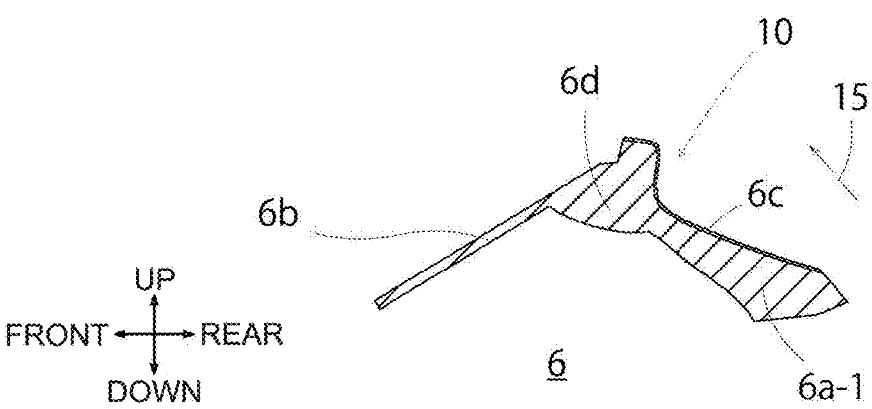
FIG. 18 is a sectional view seen along line F-F of the fishing hook pressing member in FIG. 17.

As illustrated in FIG. 16 to FIG. 18, the fishing hook pressing member fitting protruding part 6*a* includes a fishing hook pressing member fitting protruding part main portion 6*a*-1 (hereinafter, also simply referred to as a protruding part main portion 6*a*-1) extending in the arrow 15 direction of FIG. 18, and a fishing hook pressing member fitting protruding part sub-portion 6*a*-2 (hereinafter, also simply referred to as a protruding part sub-portion 6*a*-2) protruded in the left-right direction from the protruding part main portion 6*a*-1. Furthermore, as illustrated in FIG. 14 and FIG. 15, the fishing hook pressing member fitting recessed part 2*a* includes a fishing hook pressing member fitting recessed part main portion 2*a*-1 (hereinafter, also simply referred to as a recessed part main portion 2*a*-1), and a fishing hook pressing member fitting recessed part sub-portion 2*a*-2 (hereinafter, also simply referred to as a recessed part sub-portion 2*a*-2), and the protruding part main portion 6*a*-1 and the recessed part main portion 2*a*-1, and the protruding part sub-portion 6*a*-2 and the recessed part sub-portion 2*a*-2 are respectively fitted to each other. A portion (fishing hook support slit 6*c*) to be in contact with the fishing hook 7, of the protruding part main portion 6*a*-1, and a portion (fishing hook fitting recessed part 2*e*) to be in contact with the fishing hook 7, of the recessed part main portion 2*a*-1 are groove portions each in a shape that is along the bend and curve of the front portion of the fishing hook 7 to lock the fishing hook 7 more firmly, and by the above-described shape, in the complete form P4, the fishing hook pressing member 6, the fishing hook 7, and the front body 2 are in close contact with each other and the fishing hook 7 is fixed to the lure body without moving.

In the lure 1A of the present first embodiment, in order that the fishing hook pressing member 6 has sufficient strength, a width in the left-right direction of the recessed part main portion 2*a*-1 (length of a straight line J1 illustrated in FIG. 14) is 2.1 mm, and a width in the left-right direction of the protruding part main portion 6*a*-1 (length of a straight line J2 illustrated in FIG. 16) is 2.0 mm. However, the respective widths do not necessarily have to be the above-described values, and favorable results were also obtained when the width in the left-right direction of the recessed part main portion 2*a*-1 is 0.5 to 10.1 mm, and the width in the left-right direction of the protruding part main portion 6*a*-1 is 0.5 to 10 mm. In order that the fishing hook pressing member 6 is not removed from the front body 2 unintentionally, it is preferable that the width in the left-right direction of the recessed part main portion 2*a*-1 and the width in the left-right direction of the protruding part main portion 6*a*-1 are the same, or the width in the left-right direction of the recessed part main portion 2*a*-1 is larger than the width in the left-right direction of the protruding part main portion 6*a*-1 by a value within 0.1 mm. In the lure 1A of the present embodiment, the widths in the left-right direction of the recessed part main portion 2*a*-1 and the protruding part main portion 6*a*-1 are constant, but these widths do not necessarily have to be constant, and the widths may decrease as progress to the rear or in an opposite direction of the arrow 15.

Furthermore, in the lure 1A in the complete form P4, in order to prevent the fishing hook pressing member 6 from unintentionally detaching from the front body 2, it is preferable that sufficient friction resistance exists between the front body 2 and the fishing hook pressing member 6. In the lure 1A of the present first embodiment, for the above-described reason, an area where the recessed part main portion 2*a*-1 and the protruding part main portion 6*a*-1 contact each other is 153 $mm^2$. However, favorable results were also obtained by appropriately setting the area where the recessed part main portion 2*a*-1 and the protruding part main portion 6*a*-1 contact each other to a value of 40 $mm^2$ or more according to the shapes of the recessed part main portion 2*a*-1 and the protruding part main portion 6*a*-1.

The protruding part sub-portion 6*a*-2 and the recessed part sub-portion 2*a*-2 are portions for preventing the fishing hook pressing member 6 from detaching from the front body 2 by a force in the arrow 15 direction that occurs when the fishing line tied to the fishing line fastening portion 7*b* is pulled and is applied from the front portion of the fishing hook 7 to the fishing hook pressing member 6. When the fishing hook pressing member 6 tries to move in the arrow 15 direction with respect to the front body 2, the protruding part sub-portion 6*a*-2 that is protruded in the left-right direction, and the recessed part sub-portion 2*a*-2 that is fitted to the protruding part sub-portion 6*a*-2 abut on each other to be resistance, and thereby the fishing hook pressing member 6 is prevented from detaching from the front body 2. In addition, by increasing the contact area of the fishing hook pressing member 6 and the front body 2 to increase the friction resistance by including the protruding part sub-portion 6*a*-2 and the recessed part sub-portion 2*a*-2, the fishing hook pressing member 6 is prevented from detaching from the front body 2 to a direction other than the arrow 15 direction. The protruding part sub-portion 6*a*-2 is also a portion for supporting a lip described later.

As illustrated in FIG. 14 and FIG. 16, in the lure 1A of the present first embodiment, a set of the protruding part sub-portions 6*a*-2 and the recessed part sub-portions 2*a*-2 is provided laterally symmetrically on each of the left and the right, but the lure of the present disclosure may include a plurality of sets of the protruding part sub-portions 6*a*-2 and the recessed part sub-portions 2*a*-2. When it is possible to attach the fishing hook pressing member 6 to the front body 2 sufficiently firmly by the protruding part main portion 6*a*-1 and the recessed part main portion 2*a*-1, the lure of the present disclosure does not have to include the protruding part sub-portion 6*a*-2 or the recessed part sub-portion 2*a*-2. In the lure 1A of the present first embodiment, widths in the up-down direction of the recessed part sub-portion 2*a*-2 and the protruding part sub-portion 6*a*-2 are constant, but these widths do not necessarily have to be constant, and the widths may be smaller as progress to the rear.

The fishing hook pressing member fitting recessed part 2*a* of the front body 2 is opened to the fishing hook accommodation portion 8 of the rear body 3 by the fishing hook insertion hole 2*g* as illustrated in FIG. 13 to FIG. 15. The fishing hook insertion hole 2*g* is a hole that connects the fishing hook pressing member fitting recessed part and the fishing hook accommodation portion to put the rear portion of the fishing hook 7 (from the extension shaft portion 7*f* to the hook point 7*a*) in and out of the fishing hook accommodation portion 8 of the rear body 3 at the time of the attachment A and attachment B.

As illustrated in FIG. 14 and FIG. 15, the fishing hook fitting recessed part 2*e* is a groove having a shape along the bend and curve of the fishing hook 7, and included in the contact part of the recessed part main portion 2*a*-1 with the fishing hook 7, and the fishing hook fitting recessed part is fitted to the front portion of the fishing hook (portion from a portion behind the fishing line fastening portion 7*b* to the extension shaft portion 7*f*). The lateral width of the fishing hook fitting recessed part is the same as or narrower than the lateral width of the recessed part main portion 2*a*-1, and is nearly the same as the wire diameter of the fishing hook 7.

As illustrated in FIG. 16 to FIG. 18, the fishing hook support slit 6*c* is a groove having a shape along the bend and curve of the fishing hook 7 and is included in the contact part of the protruding part main portion 6*a*-1 with the fishing hook 7, and a lateral width of the fishing hook support slit 6*c* is the same as or narrower than the lateral width of the protruding part main portion 6*a*-1, and is nearly the same as the wire diameter of the fishing hook 7. The fishing hook fitting recessed part 2*e* and the fishing hook support slit 6*c* are overlaid on each other in the lure 1A in the complete form P4, and form a space in which the front portion of the fishing hook 7 is contained. Since the front portion of the fishing hook 7 is contained in this space, the front portion of the fishing hook 7 is in close contact with the front body 2 and the fishing hook pressing member 6, very small amounts of yawing, pitching and rolling of the fishing hook 7 against the body are suppressed, and the fishing hook is fixed to the front body without moving.

Hereinafter, methods and steps of the attachment A and the detachment A will be described with details illustrated in FIG. 20.

Figure 20:
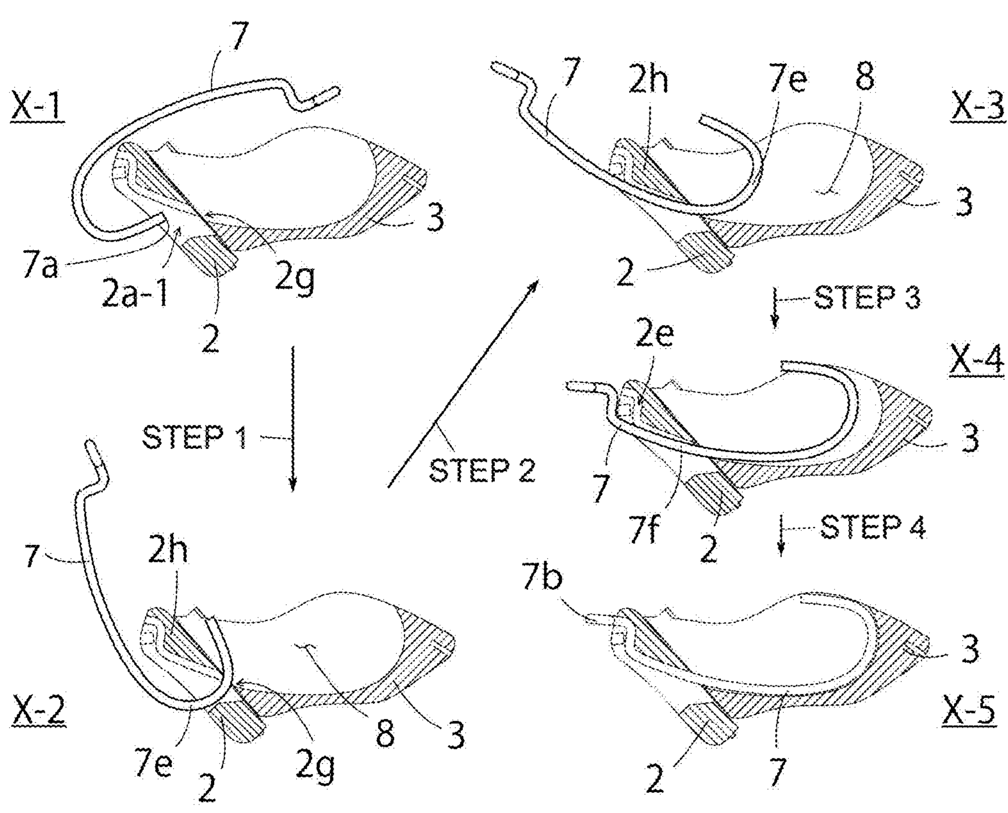
FIG. 20 is an explanatory sectional side view illustrating a process of attaching and detaching the fishing hook of the lure in FIG. 1.
Figure 21:
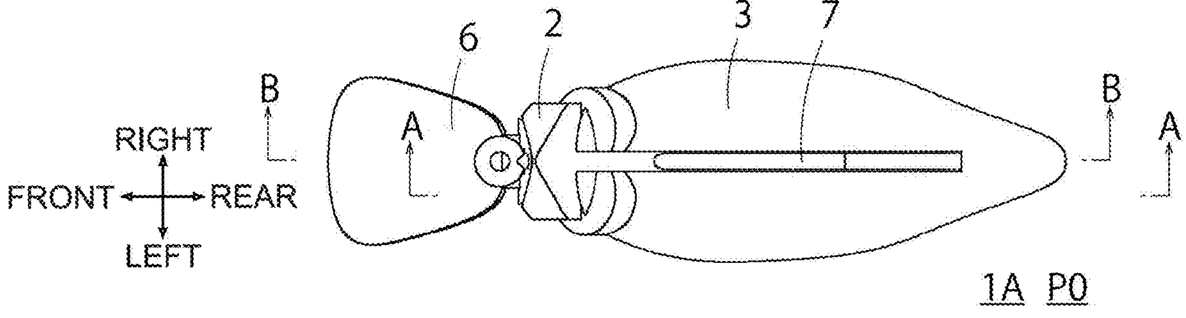
FIG. 21 is a top view of the lure in FIG. 1.

First, as illustrated in X-1 in FIG. 20, in a state where the fishing hook 7 is reversed, the hook point 7*a* is put into the recessed part main portion 2*a*-1, and the hook point is further inserted through the fishing hook insertion hole 2*g* (step 1). Next, as illustrated in X-2 in FIG. 20, at a time point when the curved portion 7*e* approaches the fishing hook insertion hole 2*g*, the fishing hook 7 is rotated half clockwise to insert the curved portion 7*e* into the fishing hook accommodation portion 8 provided in the rear body 3 to bring about the state of X-3 illustrated in FIG. 20 (step 2). Finally, the extension shaft portion 7*f* is inserted into the fishing hook accommodation portion 8 to bring about a state of X-4 illustrated in FIG. 20 (step 3), the front portion of the fishing hook 7 is fitted into the fishing hook fitting recessed part 2*e* to bring about a state of X-5 (fishing hook attached form P3) illustrated in FIG. 20, and thereby the attachment A is completed (step 4). The detachment A is completed by performing the above-described step 1 to step 4 in reverse order. In order that the attachment A and the detachment A are enabled, it is preferable that the shape of a section 2*h* of the front body 2 is a shape that does not interfere with the fishing hook 7 at the time of step 1 and step 2.

In the lure 1A of the present first embodiment, the attachment A and detachment A are performed in the above-described steps, but the steps of the attachment A and the detachment A are not necessarily as described above. For example, when a portion having a largest lateral width of the fishing hook (generally, the fishing line fastening portion) is smaller than the width in the left-right direction of any one of the fishing hook accommodation portion 8, the recessed part main portion 2*a*-1, and the fishing hook insertion hole 2*g*, such steps may be adopted as performing the attachment A by inserting the fishing hook into the respective spots in order of the fishing hook accommodation portion 8, the fishing hook insertion hole 2*g*, and the recessed part main portion 2$a$-1 from the fishing line fastening portion, performing the detachment A in the reverse order to the above, and the like.

As illustrated in FIG. 16 to FIG. 18, the fishing hook pressing member 6 includes a lip 6$b$. As a result of the lip receiving resistance of water, the lure 1A goes underwater while wobbling to the left and right at the time of reeling. The lip is fixed and supported to the fishing hook pressing member 6 by the protruding part sub-portion 6$a$-2 illustrated in FIG. 16 and FIG. 17, and a lip support portion 6$d$ illustrated in FIG. 18. In the lure 1A of the present embodiment, the lip has a planar shape that widens toward the front and inclines with respect to the front-rear direction of the body, but the lip does not necessarily have to have the shape and angle like this, and the lip does not have to be provided. As described above, since the fishing hook pressing member 6 is attachable to and detachable from the body, it is possible to change movement of the lure at the time of reeling (winding up the lure by the reel) by replacing the fishing hook pressing member with a fishing hook pressing member having a lip with a different shape.

In order to lock the fishing hook to the front body 2, it is preferable that the front portion of the fishing hook has a complicated shape, and the fishing hook is readily available to the public. Therefore, in the lure 1A of the present first embodiment, the fishing hook 7 is a fishing hook for a soft lure (lure molded from a material having flexibility and elasticity) that is generally called an offset hook having two bent portions 7$c$ between the fishing line fastening portion 7$b$ and the extension shaft portion 7$f$ as illustrated in FIG. 7. However, the fishing hook does not necessarily have to be an offset hook if it is possible to lock the fishing hook to the front body, and may be, for example, a fishing hook other than an offset hook, such as a straight hook and a trout hook, that do not have a bent portion. Furthermore, the fishing hook may be an exclusive fishing hook having a shape suitable for the lure of the present disclosure.

The lure 1A is a lure generally called a hard plug that includes a buoyant body inside among hard lures, has an enough weight to float in the water, and goes underwater by reeling (winding up the lure by the reel). However, the lure according to the present disclosure does not necessarily have to include a buoyant body inside, does not have to have an enough weight to float in the water, or does not have to go underwater by reeling.

The lure that is generally called a hard plug generally includes air in an upper side portion of the lure, the upper side portion has buoyancy, and by balancing with the weight included at the lower side portion of the lure, the lure can stably move at the time of reeling. However, since the rear body 3 of the lure 1A of the present first embodiment includes the fishing hook accommodation portion 8 that is filled with water in the water, and includes the rear body curved portion 3$c$ in addition, the buoyance of the upper side portion of the lure becomes smaller as compared with an ordinary hard plug. Therefore, movement of the lure 1A at the time of reeling tends to be unstable, and in order to obtain stable movement at the time of reeling, it is preferable that the rear body 3 is molded to be lighter as compared with an ordinary hard plug. Furthermore, since the rear body 3 includes the fishing hook accommodation portion 8, and strength in the left-right direction tends to be lower as compared with an ordinary hard lure, it is preferable to form the rear body 3 from a material having sufficient strength even with a small volume.

For the above-described reason, it is preferable that the rear body 3 is molded with a shell mechanism using a hard plastic as the material, and in the lure 1A of the present first embodiment, the rear body is molded with a shell structure of 0.8 mm using PLA (Ply-Lactic Acid), which is hard plastic, as the material.

In the lure 1A of the present first embodiment, the material of the rear body is PLA, but the material of the rear body does not necessarily have to be PLA, and may be another hard plastic. Furthermore, if the lure 1A can secure sufficient buoyancy to stably move at the time or reeling, and can obtain sufficient strength, the material of the rear body is not limited to hard plastic, and may be a hard material such as metal, and wood, or a soft material such as soft resin, or combinations of these materials, and the rear body does not have to have the shell structure.

In the lure 1A of the present first embodiment, the rear body 3 is formed with the shell structure having a thickness of 0.8 mm, but favorable results were also obtained by appropriately setting the thickness of the shell structure to a value within a range of 0.4 to 4 mm according to the size and shape of the body.

In the lure 1A of the present first embodiment, the material of the front body 2 and the fishing hook pressing member 6 is PLA (Poly-Lactic Acid), which is hard plastic, but the material of the front body and the fishing hook pressing member does not necessarily have to be PLA, and may be a hard material such as metal, wood, and hard plastic other than PLA, or a soft material such as soft resin, or combinations of these materials.

The lure according to the present disclosure is described above based on the first embodiment, and the lure according to the present disclosure may be modified, and changed as follows.

In the lure 1A of the above-described embodiment, the lower side surface of the rear body forward protruding part 3$b$ and the lower side surface of the open space are planes. However, for example, a recessed part aiming at fixing the upper side portion and the lower side portion of the elastic member 5 to the body, and accommodating the elastic member at the time of contraction may be provided at each of the lower side surface of the rear body forward protruding part 3$b$ and the lower side surface of the open space, or either one of them.

A weight may be provided at the lower side portion of the rear body 3 or the lower side portion of the front body 2. Alternatively, a recessed part may be provided at the lower side portion of the rear body and the lower side portion of the front body, and a weight may be attached to the recessed part.

In the lure 1A of the present first embodiment, the rear body 3 is a hollow structure, but the present disclosure is not limited to this and can be applied to a lure in which the rear body 3 has no cavity and is a solid structure.

The front body 2 and the rear body 3 may have outer shapes that imitate, for example, fish, an earthworm, a shrimp, a crayfish, a frog, an insect or a small animal such as a mouse.

In the lure 1A of the present first embodiment, the open spaces 2$d$ on the left and right respectively open to the left and right, and when the lure is seen from the side surface, the shafts 4 and the elastic member 5 are exposed to the outside, but in order to prevent dust from attaching to the shafts 4 and the elastic member 5, a member that closes the open spaces 2$d$ on the left and right to the left and the right respectively to the extent that does not interfere with the transformation A and the transformation B may be provided at the front body 2 or the rear body 3.

In the lure 1A of the present first embodiment, the rear body 3 is an integral member, but the body may be what is made of a plurality of mutually separated members connected by a hinge mechanism or the like. Furthermore, the shape of the rear body 3 is variously changeable in the range without departing from the gist of the present disclosure, and may be, for example, a shape that is slim, long in the front-rear direction, and generally called a minnow plug.

In the lure 1A of the present first embodiment, in order to lock the fishing hook 7 without moving by the front body 2 and the fishing hook pressing member 6, the recessed part main portion 2*a*-1, the fishing hook fitting recessed part 2*e*, the protruding part main portion 6*a*-1, and the fishing hook support slit 6*c* have the shapes along the front portion of the fishing hook 7, but as long as the front body 2 and the fishing hook pressing member 6 each contact the fishing hook in at least one point in the complete form P4, the recessed part main portion 2*a*-1, the fishing hook fitting recessed part 2*e*, the protruding part main portion 6*a*-1, and the fishing hook support slit 6*c* do not have to have the shapes along the fishing hook 7. In the case of the above, it is possible to replace the fishing hook with another fishing hook having a different shape by replacing the fishing hook pressing member with a fishing hook pressing member in which the shapes of the protruding part main portion 6*a*-1 and the fishing hook support slit 6*c* are changed.

At the time of casting, the lure 1A of the present embodiment takes on the initial form P0, but in order to increase a flight distance at the time of casting, the value of illustrated in FIG. 12 is set to 5 degrees to 45 degrees so that the rear body 3 may instantly compress the elastic member 5 by inertia during casting. In this case, since at the time of flight, the center of gravity of the lure moves further rearward and the shape of the lure changes to a shape that is less susceptible to air resistance in the travel direction and allows the lure to obtain lift, the flight distance during casting is improved.

In the lure 1A of the present first embodiment, the surfaces of the front body 2, the rear body 3, and the fishing hook pressing member 6 are not painted, but may be painted in various colors and patterns. Furthermore, in order to prevent fish from spitting the lure out when the fish bites the lure and judges that the lure is not real bait based on the texture of the material, surface treatment that does not cause the fish to feel odd when the fish bites the lure, such as attaching algae to the rear body surface, or covering the rear body surface with a soft material may be carried out.

In the lure 1A of the present first embodiment, the surface of the rear body 3 is a smooth curved surface, but in order to prevent the lure from slipping and coming off the mouth of the fish when the lure is pulled to stick the fishing hook into the mouth of the fish, surface treatment such as knurling may be applied to the rear body, or the rear body may be provided with protrusions or the like.

In the lure 1A of the present first embodiment, two members that are the front body 2 and the rear body 3 that are mutually separate bodies are slidably connected by the slide mechanism 9, but the number of members slidably connected by the slide mechanism does not necessarily have to be two, and, for example, a structure in which three or more members are connected by the slide mechanism may be adopted, for example, in which the front body, and a middle body are slidably connected by a slide mechanism, and further, the middle body and the rear body are slidably connected by a slide mechanism, and the like.

The body of the lure 1A of the present first embodiment does not contain attractants such as odorous fish attractants, but a space for installing attractants may be provided in the front body 2 or the rear body 3, and the attractants may be installed there.

In the lure 1A of the present first embodiment, the rear body curves in the upper direction so that the rear body 3 is in a shape that hides the hook point 7*a* when the lure 1A in the initial form P0 is seen from the side surface, but the hook point may be brought into a state of being hidden when the lure 1A in the initial form P0 is seen from the side surface by other means. Examples of the means are providing a protruding part that hides the hook point when the lure 1A in the initial form P0 is seen from the side surface at the rear body, and the like. Furthermore, in the case of the example, the rear body curved portion 3*c* does not have to be provided.

In the lure 1A of the present first embodiment, the shaft hole 3*a* is provided by making the hole in the rear body forward protruding part 3*b*, but the shaft hole may be reinforced by a material that is difficult to break, such as metal.

In the lure 1A of the present first embodiment, the rear body 3 is molded from only PLA (Poly-Lactic Acid), but a part imitating a fin or the like of fish may be provided on the rear body using soft resin, fiber material or the like. For example, a plurality of thread-shaped pieces made of a rubber material imitating a tail fin of fish are attached to the rear end of the lure.

In the lure 1A of the present first embodiment, the fishing hook pressing member fitting recessed part 2*a* of the front body 2 is opened forward of the front body, and the fishing hook pressing member 6 and the fishing hook 7 are attached to the fishing hook pressing member fitting recessed part 2*a* from the front, but the fishing hook pressing member fitting recessed part may be opened rearward of the front body, and the fishing hook pressing member and the fishing hook may be attached from the rear of the front body. When changing to the above-described form and attaching method, attaching/detaching work of the fishing hook pressing member and the fishing hook is performed in a state in which the rear body is slid.

The upper side portion of the fishing hook accommodation portion 8 is closed as much as possible within the range in which the transformation A and the transformation B are possible, and the shape of the fishing hook accommodation portion 8 may be changed so that the fishing hook accommodation portion 8 is filled with water even after the lure is pulled out of the water. By the above-described change, the lure weight at the time of casting increases and the flight distance is improved.

Hereinafter, as specific examples of modifications of the first embodiment of the lure according to the present disclosure, a second embodiment and a third embodiment of the lure according to the present disclosure will be described with reference to the drawings.

Figure 23:
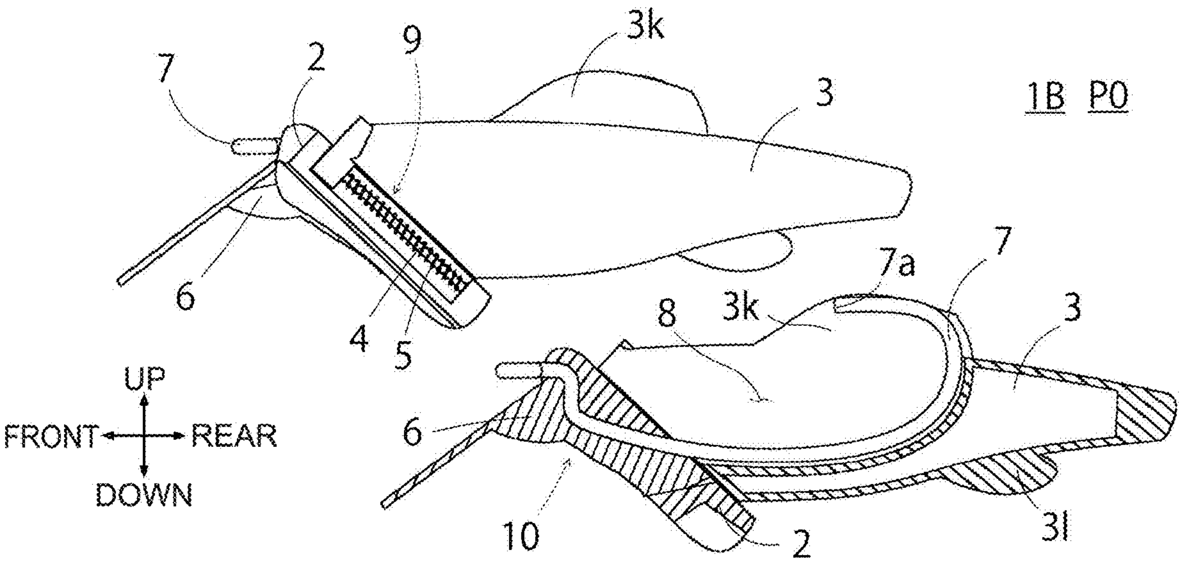
FIG. 23 is a side view and a sectional side view illustrating a fishing lure according to a second embodiment that is an example of the present disclosure.

FIG. 23 is a side view and a sectional side view illustrating a lure 1B of the present second embodiment. The lure 1B illustrated in FIG. 23 is in an initial form P0. The lure 1B has a shape imitating fish. A rear body 3 of the lure 1B has a hook point hiding protruding part 3*k* that hides a hook point 7*a* when the lure 1B in the initial form P0 is seen from a side surface, on each of the left and the right. Since it is possible to hide the hook point without forming the rear body into a curved shape by including the hook point hiding protruding part in the rear portion, it is possible to make the shape of the lure more similar to a real fish, and it is possible to make movement of the lure 1B at the time of reeling natural and more similar to that of fish. The lure 1B includes a fin 3*l*. The purpose of the fin is to make the shape of the lure more similar to that of fish and to make it easier for the fish to bite the lure, thereby making it easier for the fishing hook 7 to pierce the fish.

In the lure 1B of the present second embodiment, thicknesses in a left-right direction of the hook point hiding protruding part provided on the left and the right are respectively 0.8 mm, but do not necessarily have to be the above-described value, and favorable results were also obtained by setting the thicknesses to an appropriate value within a range of 0.2 to 4 mm according to the size and the shape of the body.

In the lure 1B of the present second embodiment, an interval in the left-right direction of the hook point hiding protruding parts on the left and right is 1.6 mm, but does not necessarily have to be the above-described value, and favorable results were also obtained by setting the interval in the left-right direction of the hook point hiding protruding parts on the left and right to an appropriate value within a range of 0.2 to 10 mm according to a width in the left-right direction of the fishing hook (wire diameter of the fishing hook in general).

In the lure 1B of the present second embodiment, a material of the fishing hook hiding protruding part is hard plastic, but the material does not necessarily have to be hard plastic, and may be metal, resin having flexibility and the like. Furthermore, as long as the hook point can be protected so as not to pierce an obstacle at a time of reeling, the hook point hiding protruding part may be a wire that is protruded in an upper direction from the rear body, or the like.

The lure 1B does not have an air chamber dividing wall 3*f*, a shape retaining portion 3*j*, and a rear body curved portion 3*c*. The lure 1B has a similar configuration to that of the lure 1A of the first embodiment except that the lure 1B has the hook point hiding protruding parts and the fin, and does not have the air chamber dividing wall, the shape retaining portion, and the rear body curved portion. The lure 1B of the second embodiment also has a slide mechanism 9 and a fishing hook attaching/detaching mechanism 10, and can perform replacement of the fishing hook, and the transformation A and the transformation B.

Figure 24:
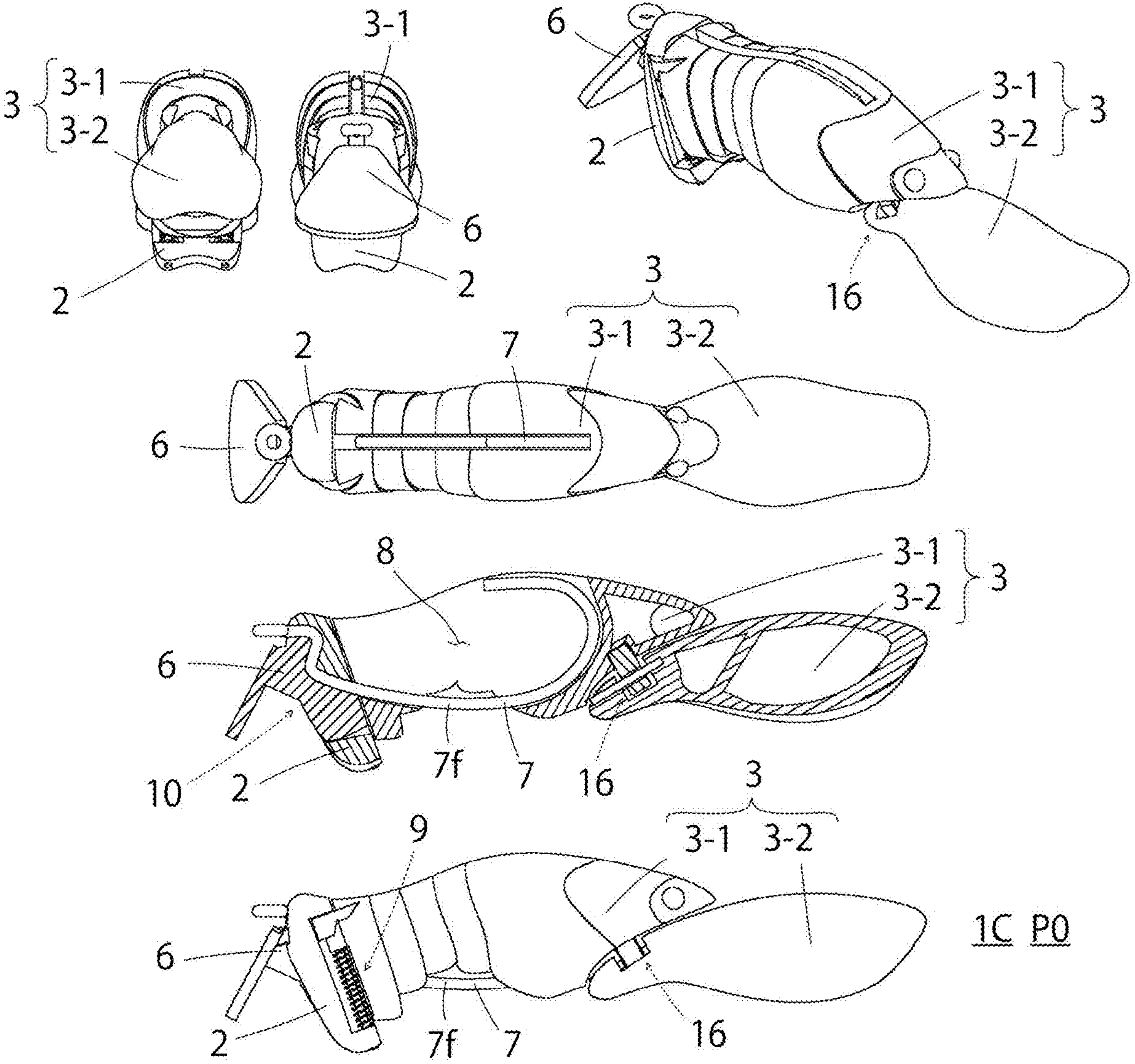
FIG. 24 is a rear view, a front view, a perspective view, a top view, a side sectional view, and a side view illustrating a fishing lure according to a third embodiment that is an example of the present disclosure.

FIG. 24 is a side view, a sectional side view, a top view, a front view, a rear view, and a perspective view, illustrating a lure 1C of the present third embodiment. The lure 1C illustrated in FIG. 24 is in an initial form P0. The lure 1C has a shape imitating a crayfish. A rear body 3 of the lure 1C has a rear body front portion 3-1 and a rear body rear portion 3-2 that are separate bodies from each other, and the rear body front portion, and rear body rear portion are swingably connected by a hinge mechanism 16. In the lure 1C, a fishing hook accommodation portion 8 opens in a downward direction, and in the initial form P0, an extension shaft portion 7*f* of a fishing hook 7 is exposed to an outside of the body. The lure 1C has an enough weight to sink in the water.

The lure 1C has a configuration similar to that of the lure 1A of the first embodiment except that the rear body 3 has the rear body front portion 3-1 and the rear body rear portion 3-2 that are separate bodies from each other, the rear body front portion and rear body rear portion are swingably connected by the hinge mechanism 16, the fishing hook accommodation portion 8 opens in the downward direction, the extension shaft portion 7*f* of the fishing hook 7 is exposed to the outside of the body in the initial form P0, and the lure 1C has an enough weight to sink in the water. The lure 1C of the third embodiment also has a slide mechanism 9 and a fishing hook attaching/detaching mechanism 10, and is capable of replacement of the fishing hook, and the transformation A and the transformation B.

The examples of the embodiments of the lure according to the present disclosure are cited and described thus far, the lure according to the present disclosure is not limited to any of the above-described embodiments and can be variously changed within the range without departing from the gist of the present disclosure.

The invention claimed is:

1. A lure, comprising:
a front body;
a fishing hook locked to the front body;
a rear body having a groove portion, and
an elastic member extending along a sliding direction of the front body and the rear body,
wherein the groove portion of the rear body hides at least a part of the fishing hook,
the front body and the rear body are connected to be relatively slidable, the front body and the rear body slide in a direction away from each other from an initial form to a fishing hook protrusion form in which the fishing hook protrudes from the rear body, and
in the fishing hook protrusion form, the elastic member urges the front body and the rear body toward the initial form.

2. The lure according to claim 1, wherein
the rear body includes a sliding surface with the front body, and
an angle formed by the sliding surface and a plane;
wherein the plane includes a point at a longest distance from the sliding surface in the rear body, and a straight line on the sliding surface that passes through a center point of the sliding surface and intersects perpendicularly to a sliding direction, and
the angle is between 5 to 95 degrees.

3. The lure according to claim 1, wherein a maximum slide distance of the front body and the rear body is 6 to 50 mm.

4. The lure according to claim 1, comprising:
a shaft; and
a shaft hole through which the shaft is inserted, wherein
the shaft is provided at one of the front body and the rear body, and
the shaft hole is provided in another one of the front body and the rear body.

5. The lure according to claim 4,
wherein the shaft comprises two shafts,
the fishing hook is located between the two shafts, and
a distance between the two shafts is 3 to 25 mm.

6. The lure according to claim 1, further comprising another member, wherein
the front body has a groove portion,
the another member fixes a fishing hook, and
the another member and the groove portion of the front body have portions that are along a shape of the fishing hook.

7. The lure according to claim 6, wherein the another member has a lip.

8. The lure according to claim 1, wherein a material of the rear body is hard plastic.

9. A lure, comprising:
a front body;
a fishing hook locked to the front body;
a rear body having a groove portion, and
an elastic member,
wherein the groove portion of the rear body hides at least a part of the fishing hook, the front body and the rear body are connected to be relatively slidable, when the front body and the rear body relatively slide, the fishing hook protrudes from the rear body, the elastic member urges the front body and the rear body in opposite directions from each other, the elastic member is a compression coil spring, a natural length of the compression coil spring when no load is applied is 6.1 to 50.1 mm, and a spring constant is 0.01 to 0.7 N/mm, and a material of the compression coil spring is stainless steel.

* * * * *